United States Patent
Kuk et al.

(10) Patent No.: US 10,913,201 B2
(45) Date of Patent: Feb. 9, 2021

(54) OBJECT FORMING APPARATUS AND CONTROLLING METHOD THEREOF

(71) Applicant: Samsung Electronics Co., Ltd., Suwon-si (KR)

(72) Inventors: Keon Kuk, Yongin-si (KR); Eun-bong Han, Suwon-si (KR); Young-dae Ko, Suwon-si (KR); Hyeon-hyang Kim, Seoul (KR); O-hyun Beak, Seoul (KR); Jun-hee Lee, Seongnam-si (KR); Yeon-kyoung Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

(21) Appl. No.: 15/229,981

(22) Filed: Aug. 5, 2016

(65) Prior Publication Data
US 2017/0057161 A1     Mar. 2, 2017

(30) Foreign Application Priority Data
Sep. 2, 2015   (KR) ...................... 10-2015-0124196

(51) Int. Cl.
| B29C 67/00 | (2017.01) |
| B33Y 10/00 | (2015.01) |
| B33Y 30/00 | (2015.01) |
| B33Y 50/00 | (2015.01) |
| B29C 64/112 | (2017.01) |
| B33Y 50/02 | (2015.01) |

(52) U.S. Cl.
CPC ........ B29C 64/112 (2017.08); B29C 67/0059 (2013.01); B33Y 10/00 (2014.12); B33Y 30/00 (2014.12); B33Y 50/02 (2014.12)

(58) Field of Classification Search
CPC ....... B33Y 30/00; B33Y 50/02; B29C 64/209; B29C 64/245; B29C 64/295
USPC ........................................................ 264/40.1
See application file for complete search history.

(56) References Cited

U.S. PATENT DOCUMENTS 5,175,565 A * 12/1992 Ishinaga ................ B41J 2/0451
                                                    347/17
6,165,406 A    12/2000 Jang et al.
6,259,962 B1    7/2001 Gothait
(Continued)

FOREIGN PATENT DOCUMENTS

| CN | 105643921 A | 6/2016 |
| EP | 2 902 174 A1 | 8/2015 |

(Continued)

OTHER PUBLICATIONS

Chinese Office Action dated Jul. 1, 2019, issued in Chinese Patent Application No. 201680049438.6.
(Continued)

Primary Examiner — Alexander M Weddle
(74) Attorney, Agent, or Firm — Jefferson IP Law, LLP

(57) ABSTRACT

An object forming apparatus and a controlling method thereof are provided. The object forming apparatus includes an injector configured to inject an object forming material based on object data, a base part in which an object is formed through stacking of the injected object forming material, a sensor configured to detect a height of the object stacked on the base part, and a controller configured to control the injector based on a signal output from the sensor.

19 Claims, 30 Drawing Sheets

(56) References Cited

U.S. PATENT DOCUMENTS

| | | |
|---|---|---|
| 6,270,335 B2 | 8/2001 | Leyden et al. |
| 6,360,656 B2 | 3/2002 | Kubo et al. |
| 6,612,824 B2 | 9/2003 | Tochimoto et al. |
| 6,813,594 B2 | 11/2004 | Guertin et al. |
| 6,850,334 B1 | 2/2005 | Gothait |
| 6,907,307 B2 | 6/2005 | Chen et al. |
| 7,497,977 B2 | 3/2009 | Nielsen et al. |
| 8,292,403 B2 | 10/2012 | Iwata |
| 2005/0023719 A1 | 2/2005 | Nielsen et al. |
| 2005/0087897 A1 | 4/2005 | Nielsen et al. |
| 2007/0228592 A1* | 10/2007 | Dunn ............... B29C 64/106 264/40.4 |
| 2011/0100725 A1* | 5/2011 | Yamamoto ......... B41J 2/04506 177/116 |
| 2015/0210007 A1* | 7/2015 | Durand ............. B29C 67/0051 264/401 |
| 2015/0210011 A1 | 7/2015 | Conrow et al. |
| 2015/0276987 A1* | 10/2015 | McKenzie ......... G02B 27/0012 427/10 |
| 2016/0129633 A1* | 5/2016 | Huang ............... B29C 64/20 264/40.7 |

FOREIGN PATENT DOCUMENTS

| | | | |
|---|---|---|---|
| JP | 3366512 B2 | 1/2003 | |
| JP | 2003-340628 A | 12/2003 | |
| JP | 4908679 B2 | 4/2012 | |
| KR | 10-1483161 B1 | 1/2015 | |
| WO | 2015/102328 A1 | 7/2015 | |
| WO | WO-2015102328 A1 * | 7/2015 | ......... B29C 67/0059 |

OTHER PUBLICATIONS

Chinese Office Action with English translation dated Apr. 20, 2020; Chinese Appln. No. 201680049438.6.

Chinese Office Action with English translation dated Sep. 2, 2020; Chinese Appln. No. 201680049438.6.

* cited by examiner

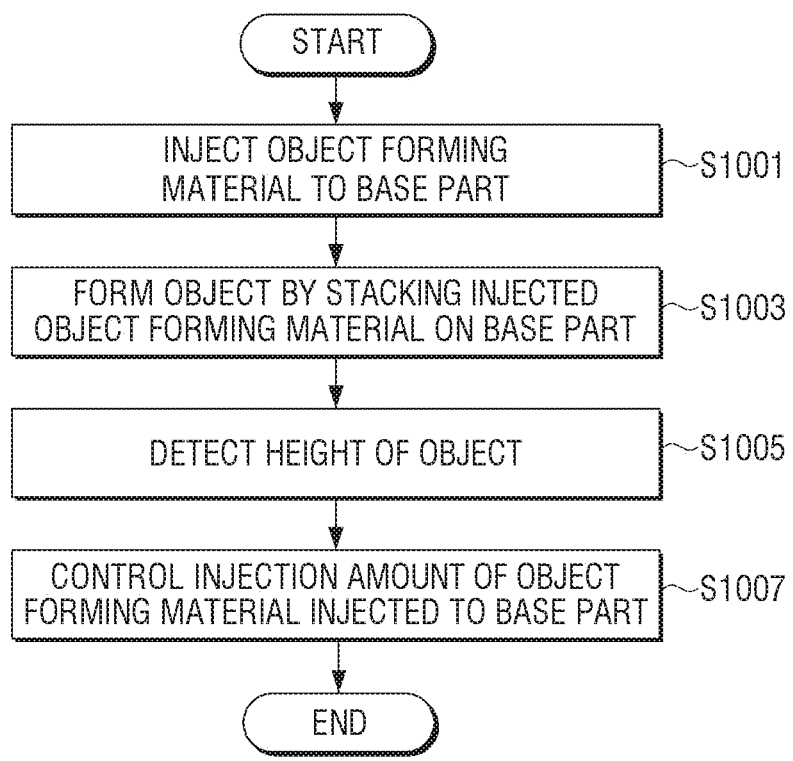

OBJECT FORMING APPARATUS AND CONTROLLING METHOD THEREOF

CROSS-REFERENCE TO RELATED APPLICATION(S)

This application claims the benefit under 35 U.S.C. § 119(a) of a Korean patent application filed on Sep. 2, 2015 in the Korean Intellectual Property Office and assigned Serial number 10-2015-0124196, the entire disclosure of which is hereby incorporated by reference.

TECHNICAL FIELD

The present disclosure relates to apparatuses and methods consistent with an object forming apparatus and a controlling method thereof.

BACKGROUND

The object forming apparatus may be apparatuses which form and mold an object having a certain shape using various types of object forming materials curable under certain conditions, for example, hot-melt wax, a thermosetting resin, a photo curable resin, a metal, and the like. The object forming apparatuses may include three-dimensional (3D) printers.

The object forming apparatuses may manufacture an object through various methods. For example, the object forming apparatuses may form objects by cutting a raw material using a cutting machine or by stacking a material in a fixed shape through injection of input wax or a liquid resin. In another example, the object forming apparatuses may form an object by melting a material through laser irradiation and coagulating the melted material in a fixed shape or by radiating an adhesive into a material.

The object forming apparatuses which form an object by injecting a liquid resin may use a piezoelectric type ink jet head to discharge the liquid resin. The object forming material may be configured of materials for basic three colors, that is, cyan (C), magenta (M), and yellow (Y) to represent color of the object, and a plurality of separate heads may be used.

The piezoelectric type ink jet heads may be expensive and may further have disadvantages of price increase since the plurality of heads are used to represent the color. Since the piezoelectric type ink jet head is large in a size and a control board and a maintenance unit have to be installed for driving of the piezoelectric type ink jet head, the object forming apparatuses may be increased in a size.

Therefore, a need exists for an object forming apparatus which forms a high quality object through correction using a measured height of the object in the forming of the object.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an object forming apparatus which forms a high quality object through correction using a measured height of the object in the forming of the object.

One or more various embodiments relate to an object forming apparatus with a reduced size by employing a low-priced thermal inkjet head. Since a micro heater is disposed in an ink chamber of the thermal ink jet head and is heated to discharge the object forming material, the temperature around the head may affect the discharge of the object forming material, and the formed object may be different from object data due to the change in the discharge speed and weight of a liquid droplet according to the temperature.

In accordance with an aspect of the present disclosure, an object forming apparatus is provided. The object forming apparatus includes an injector configured to inject an object forming material based on object data, a base part in which an object is formed through stacking of the injected object forming material, a sensor configured to detect a height of the object stacked on the base part, and a controller configured to control the injector based on a signal output from the sensor.

The injector may include a chamber to which the object forming material is supplied, a heater configured to generate a bubble in an inside of the chamber by applying heat to the object forming material in the inside of the chamber, and a nozzle configured to inject the object forming material to the base part based on pressure, which is increased according to bubble generation, in the inside of the chamber.

The controller may control the heater to control an injection amount of the object forming material injected from the injector.

The controller may determine a deviation by comparing a height of the object calculated from the object data and a height of the object formed in the base part, which is calculated based on the signal output from the sensor, and control an injection amount of the object forming material injected from the injector based on the deviation.

A plurality of injectors for colors may be provided. The controller may control injection amounts of object forming materials injected from the injectors for colors based on the deviation.

The controller may control a temperature of the heater in proportion to the height of the object in response to the object of which a cross-sectional area is reduced in a Z-axis direction being formed.

In response to the object of which a cross-sectional area is reduced in the X-axis direction being formed, the controller may control a temperature of the heater according to the forming of the object in an X-axis direction.

The controller may control the injector to form a pattern detected by the sensor within the object in forming of the object.

The pattern may be formed using at least one of a certain color and shape.

The object forming apparatus may further include a base part moving unit configured to rotate the base part.

The controller may control the base part moving unit to rotate the base part to a preset angle based on a z-axis in a fixed period.

The controller may control the base part by rotating the base part to the preset angle in the fixed period.

The controller may control a temperature of the heater according to a total usage time of the injector.

The object forming apparatus may further include a maintenance stage. The maintenance stage may include a scale configured to measure a weight of the object forming material injected through the injector.

The controller may calculate an average weight of a liquid droplet injected from the injector through the scale, and control an amount of the object forming material injected from the injector based on the average weight of the liquid droplet.

The controller may control a temperature of the heater by controlling a voltage and a width of a pulse signal applied to the heater.

The controller may control a temperature of the heater by applying a pre pulse before the pulse signal is applied to the heater.

In accordance with an aspect of the present disclosure, a method of controlling an object forming apparatus is provided. The method includes injecting an object forming material to a base part based on object data, forming an object by stacking the injected object forming material on the base part, detecting a height of the formed object, and controlling an injection amount of the object forming material injected to the base part based on the detected height of the object.

The controlling of the injection amount of the object forming material may include calculating a reference height of the object from the object data, determining a deviation by comparing the reference height of the object and a height of the object formed on the base part, and controlling the injection amount of the object forming material injected to the base part based on the deviation.

The method may further include rotating the base part to a preset angle based on a Z-axis in a fixed period.

According to an object forming apparatus and a controlling method thereof, manufacturing cost may be reduced by using a low-priced thermal ink jet head, and a high quality object may be formed by compensating a cumulative error through a difference from the object data in an object forming process.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 21 is a flowchart illustrating an object forming process of an object forming apparatus according to an embodiment of the present disclosure.

Throughout the drawings, like reference numerals will be understood to refer to like parts, components, and structures.

DETAILED DESCRIPTION

Figure 1:
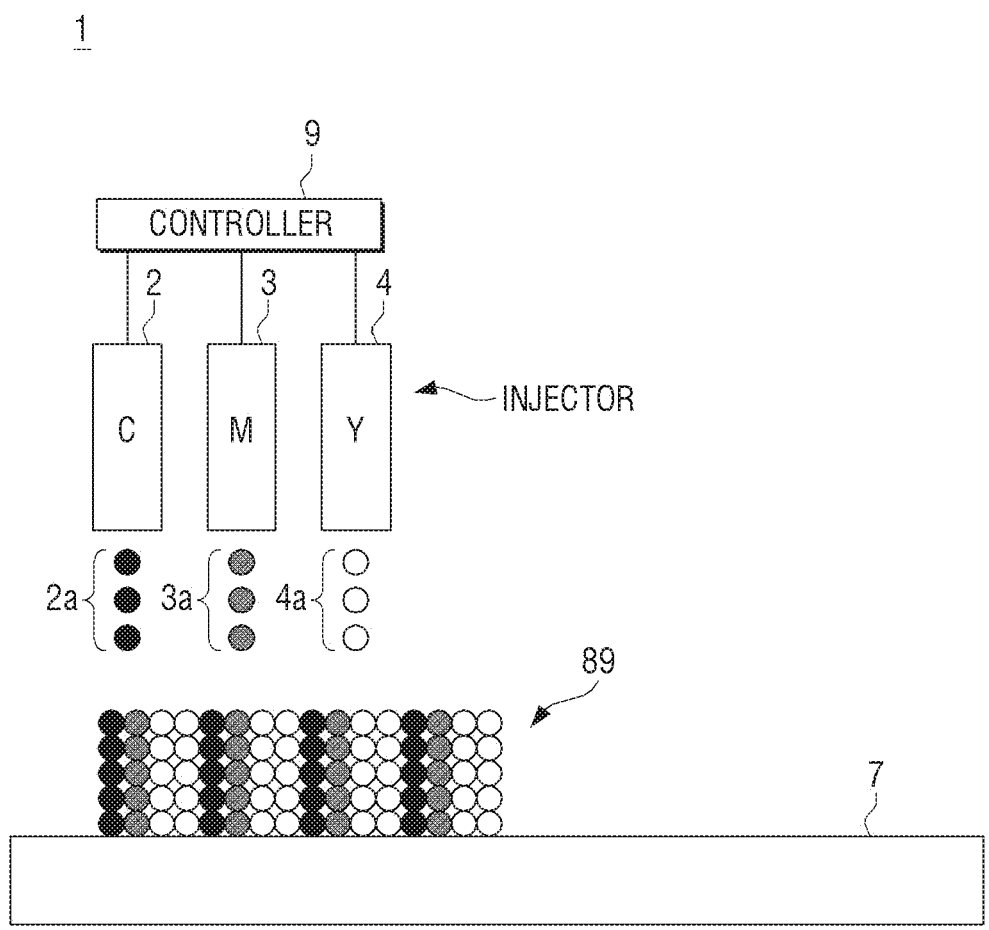
FIG. 1 is a diagram illustrating an object forming apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It will be further understood that the terms "include,", "may include,", "comprise,", and/or "may comprise," when used herein, specify the presence of stated features (for example, numerical values, functions, operations, elements, and/or components), but do not preclude the presence or addition of one or more other features.

In the description, the phrases "A or B,", "at least one of A or/and B,", "one or more of A or/and B" may include all possible combinations of the stated items".

For example, the phrases "A or B,", "at least one of A and B,", "at least one of A or B" may refer to all combinations (1) "including at least one A," (2) "including at least one B,", and (3) "including at least one A and at least one B.".

It will be understood that, although the terms first, second, and the like, may be used herein in reference to elements of the present disclosure, such elements should not be construed as limited by these terms. The terms are used only to distinguish one element from other elements. For example, a first user apparatus and a second user apparatus may refer to different user apparatuses regardless of an order or importance. For example, without departing from the spirit of the inventive concept, a first element may refer to a second element, and similarly, the second element may refer to the first element.

It will be understood that when an element (for example, a first element) is referred to as being "(operatively or communicatively) coupled with/to" or "connected to" another element (for example, a second element), the element can be directly connected or coupled to the other element or intervening elements (For example, third elements) may be present. In contrast, when an element is referred to as being "directly connected to" or "directly coupled to" another element, there are no intervening elements or layers present.

In the description, the term "configured to (or set to)" may be interchangeably used, for example, to suitable for", "having the capacity to", "designed to", "adapted to", "made to", or "capable of" depending on the situation. The term "configured to (or set to)" may not necessarily refer to only "specifically designed to" in hardware. In contrast, the phrase "an apparatus configured to" may refer to the apparatus "capable of" together with other apparatus or parts in any situation. For example, the phrase "a processor configured to (or set to) perform A, B, and C" may refer to a dedicated processor (for example, embedded processor) configured to perform a corresponding operation or a general purpose processor (for example, central processing unit (CPU) or application processor) capable of performing corresponding operations by executing at least one or more software programs stored in a storage device.

The terminology used herein is for the purpose of describing particular embodiments of the present disclosure only and is not intended to be limiting of the present disclosure.

As used herein, the singular forms "a", "an" and "the" are intended to include the plural forms as well, unless the context clearly indicates otherwise. In various embodiments of the present disclosure, the articles "a," "an," and "the" are singular in that they have a single referent. However, the use of the singular form in the present document should not preclude the presence of more than one referent. In other words, elements of the present disclosure referred to in the singular may number one or more, unless the context clearly indicates otherwise. Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, an object forming apparatus according to an embodiment of the present disclosure will be described with reference to FIG. 1.

FIG. 1 is a diagram illustrating an object forming apparatus according to an embodiment of the present disclosure.

Referring to FIG. 1, an object forming apparatus 1 may include a plurality of injectors 2, 3, and 4 configured to inject object forming materials 2a, 3a, and 4a, and an object forming unit 7 in which an object 89 is formed by stacking the injected object forming materials 2a to 4a.

The plurality of injectors 2 to 4 may inject the object forming materials 2a to 4a having certain colors toward the object forming unit 7. The injectors 2 to 4 may inject equally the object forming materials 2a to 4a.

For example, the phrase "equally inject" may mean that the injection amounts of the object forming materials 2a to 4a injected from the injectors 2 to 4 may be equally to each other. In another example, the phrase "equally inject" may mean that the injection amounts of the object forming materials 2a to 4a injected from the injectors 2 to 4 for a fixed time may be completely equally to each other or may be different from each other within a certain allowable range. For example, the injectors 2 to 4 may inject the object forming materials 2a to 4a in the completely equal amount or the injectors 2 to 4 may inject the object forming materials 2a to 4a in an almost equal or similar amount. For example, the first injector 2 may inject the object forming material 2a 100 times, the second injector 3 may inject the object forming material 3a 110 times, and the third injector 4 may inject the object forming material 4a 99 times. Accordingly, the phrase "the first to third injectors 2 to 4 inject the object forming materials 2a to 4a" may be interpreted that the first to third injectors 2 to 4 may equally inject the object forming materials 2a to 4a. The allowable range may be arbitrarily determined through selection of a designer or a user.

In an embodiment of the present disclosure, the injectors 2 to 4 may equally inject the object forming materials 2a to 4a only within a predefined range. The range may be interpreted to include at least one of a spatial range and a temporal range. For example, in response to the first to third injectors 2 to 4 being located in a predefined first section, the injectors 2 to 4 may equally inject the object forming materials 2a to 4a. In another example, in response to the first to third injectors being located in the predefined first section, the injectors 2 to 4 may equally inject the object forming materials 2a to 4a for a certain time in a first circulation. In this example, an amount of the object forming material 2a injected from the first injector 2 in the first section or in the first circulation may be equally or almost equally to an amount of the object forming material 3a injected from the second injector 3 in the first section or the first circulation. The amount of the object forming material 2a injected from the first injector 2 in the first section or the first circulation may be slightly different from the amount of the object forming material 3a injected from the second injector 3 in the first section or the first circulation within a certain range. For example, the first to third object forming materials 2a to 4a may be injected the same number of times for one circulation.

The injection of the object forming materials 2a to 4a in an equal amount may prevent the object forming materials from only specific injectors among the injectors 2 to 4 from being concentrically injected. Accordingly, the blockage of nozzles of the specific injectors or the early consumption of the specific injectors due to the concentrated injection of the object forming material through the specific injectors may be prevented. The object may be formed fast due to the equal injections of the object forming materials 2a to 4a in the injectors 2 to 4 as compared with the injection of the object forming material in only the specific injector.

The number of injectors 2 to 4 configured to inject the object forming materials 2a to 4a may be variously selected according to the selection of the designer of the object forming apparatus 1 or according to the need. For example, three injectors 2 to 4 may be employed in the object forming apparatus 1 as illustrated in FIG. 1. In another example, four injectors or five injectors may be employed in the object forming apparatus 1. In another example, two or less or six or more injectors may be employed in the object forming apparatus 1.

Colors of the object forming materials 2a to 4a injected from the injectors 2 to 4 may be arbitrarily determined according to the selection of the designer. For example, the colors of the object forming materials 2a to 4a may include red (R), green (G), and blue (B). In another example, the colors of the object forming materials 2a to 4a may include cyan (C), magenta (M), and yellow (Y). In another example, the colors of the object forming materials 2a to 4a may include black (K) or white (W). The injectors 2 to 4 may be set or manufactured to inject the object forming materials 2a to 4a having different colors. For example, four injectors may be provided in the object forming apparatus 1, and the injectors may inject object forming materials having different colors, for example, C, M, Y, and W.

In an embodiment of the present disclosure, the injectors 2 to 4 may be set or manufactured to inject only the object forming materials 2a to 4a having the designated colors. For example, the object 89 may be formed by injecting only the C object forming material 2a in the first injector 2, injecting only the M object forming material 3a in the second injector 3, and injecting only the Y object forming material 4a in the third injector 4.

In an embodiment of the present disclosure, one injector 2 to 4 may inject the object forming materials 2a to 4a having various colors. For example, the first injector 2 may selectively inject the C object forming material 2a, the M object forming material 3a, and the Y object forming material 4a. In this example, in response to the first injector 2 being coupled to storage containers for the object forming materials, in which the object forming materials 2a to 4a are contained, using pipes, such as tubes, the storage containers for object forming materials coupled to the first injector 2 may be switched to supply the different object forming materials 2a to 4a to the first injector 2 according to control of a controller 9. The first injector 2 may receive the different object forming materials 2a to 4a according to the switching of the storage containers for object forming materials and inject the different object forming materials 2a to 4a received from the containers toward the object forming unit 7, so that the object 89 may be formed.

The object forming materials 2a to 4a may include liquid substance having fluidity. For example, the object forming materials 2a to 4a may include an epoxy resin, acrylate, a photo polymer, and the like. In another example, the object forming materials 2a to 4a may include a liquid metal.

In an embodiment of the present disclosure, the object forming materials 2a to 4a injected from the injectors 2 to 4 may include a photo curing ink cured according to received light. The photo curing ink may include a base resin, a reactive diluent, a photo polymerization initiator, coloring, a polymerization inhibitor, and other auxiliary components. The base resin may include an oligomer. The reactive diluent may include a monomer. The base resin and the reactive diluent may be combined according to the irradiation of the light, such as an ultraviolet (UV) ray, and thus the photo curing ink may be cured by the light. Accordingly, the object 89 formed by stacking of the object forming materials 2a to 4a may have a fixed shape, The photo polymerization initiator may be decomposed to a free radical by light irradiation, and may induce the polymerization reaction between the base resin and the reactive diluent. The coloring may include a pigment or a dye. The pigment may include an organic pigment, an inorganic pigment, a lake pigment, and the like. The colors of the object forming materials 2a to 4a may be determined according to the coloring. For example, the C object forming material may include a C pigment, the M object forming material may include an M pigment, the Y object forming material may include a Y pigment, and the W object forming material may include a W pigment. The polymerization inhibitor may perform a function to inhibit a dark reaction of an ink.

If necessary, the photo curing ink may include a co-solvent, an anti-kogation agent, an anti-bleeding agent, and the like. The co-solvent may assist dissolution and dispersion of the pigment in the ink. In the thermal ink jet type, the co-solvent may assist evaporation in the head. In the thermal ink jet type, the anti-kogation agent may prevent the efficiency of the heater 41 due to adhesion of an ink impurity from being degraded. The anti-bleeding agent may prevent color mixture in boundaries between the object forming materials 2a to 4a from occurring. As the co-solvent, the anti-kogation agent, or the anti-bleeding agent, materials generally employed in the object forming apparatus may be used.

In an embodiment of the present disclosure, one of the injectors 2 to 4 may inject a support material for forming a supporter separable from the object. The support material may be a material which may be melted or evaporated by heat or solved by a solvent. For example, the support material may include paraffin soluble by heat or glycerin soluble by a solvent, such as water.

If necessary, the injectors 2 to 4 may move. Moving directions of the injectors 2 to 4 may be injection directions of the object forming materials 2a to 4a, that is, a direction in which the object forming unit 7 is located. The moving directions of the injectors 2 to 4 may be directions opposite to the injection directions of the object forming materials 2a to 4a. The moving directions of the injectors 2 to 4 may be directions which form a fixed angle with the injection directions of the object forming materials 2a to 4a. For example, the moving directions of the injectors 2 to 4 may be directions perpendicular to the injection directions of the object forming materials 2a to 4a.

The object forming materials 2a to 4a injected from the injectors 2 to 4 may be stacked on the object forming unit 7 to form the object 89. The object forming unit 7 may include a flat plate-like base part on which the injected object forming materials 2a to 4a may be easily stacked, a base part moving unit 22 configured to move the base part, a space provided over the base part. If necessary, the base part of the object forming unit 7 may move to a direction in which the injectors 2 to 4 are located or a direction opposite to the directions in which the injectors 2 to 4 are located. The base part may move to a direction having a fixed angle with respect to the injection directions of the object forming materials 2a to 4a. For example, the base part may move to a direction perpendicular to the injection directions of the object forming materials 2a to 4a.

The object forming apparatus 1 may further include the controller 9 configured to control an operation thereof. The controller 9 may control an operation of at least one of the injectors 2 to 4 and the object forming unit 7 to allow the object 89 to be formed. For example, the controller 9 may control injection timings of the injectors 2 to 4, injection amounts or injection patterns of the object forming materials 2a to 4a, movements of the injectors 2 to 4, a movement of the object forming unit 7, and the like. In an embodiment of the present disclosure, the controller 9 may control the plurality of injectors 2 to 4 to equally inject the object forming materials 2a to 4a having different colors so that the object 89 is formed.

Hereinafter, an object forming apparatus according to an embodiment of the present disclosure will be described with FIGS. 2 to 20.

Figure 2:
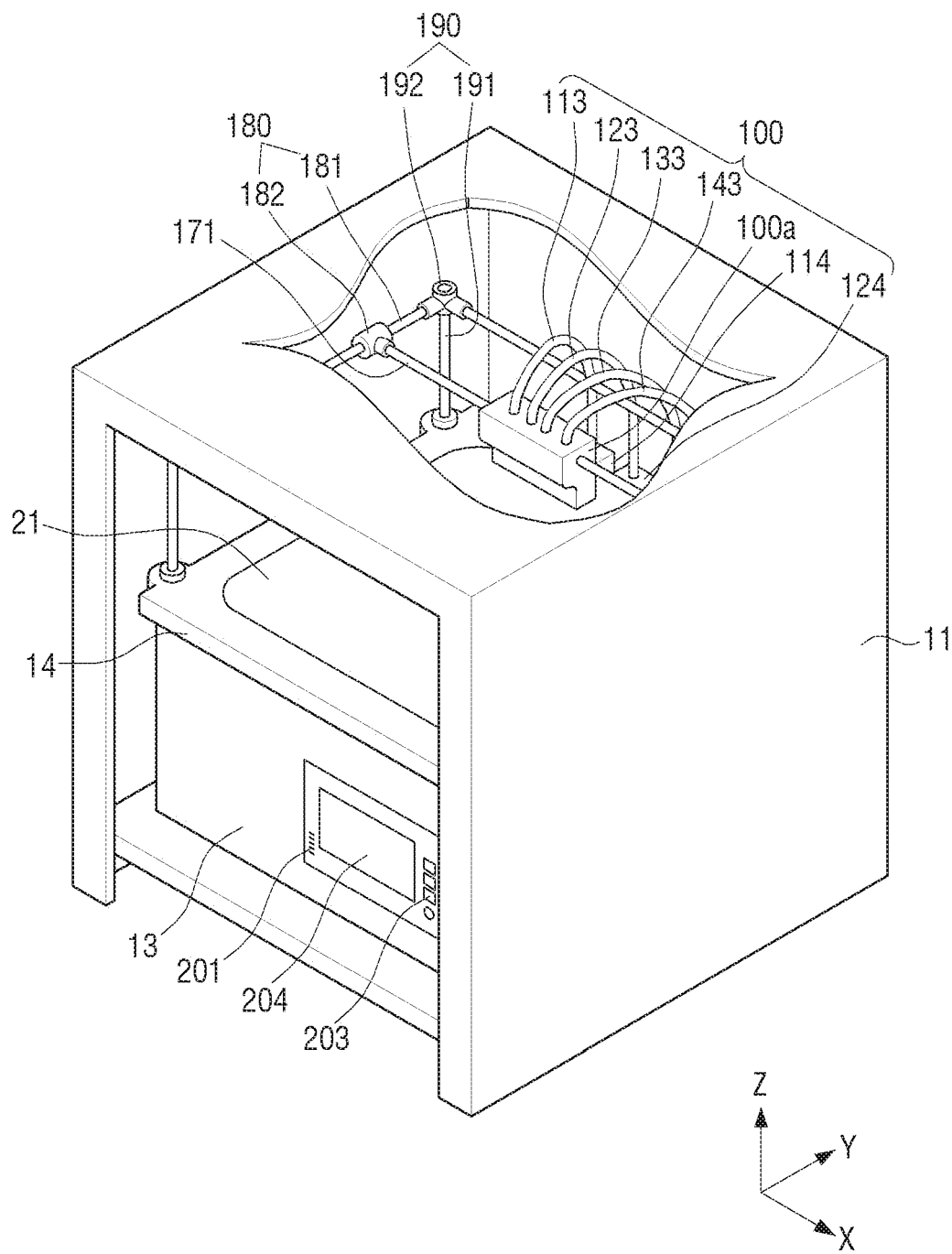
FIG. 2 is a perspective view illustrating an outer appearance of an object forming apparatus according to an embodiment of the present disclosure.
Figure 3:
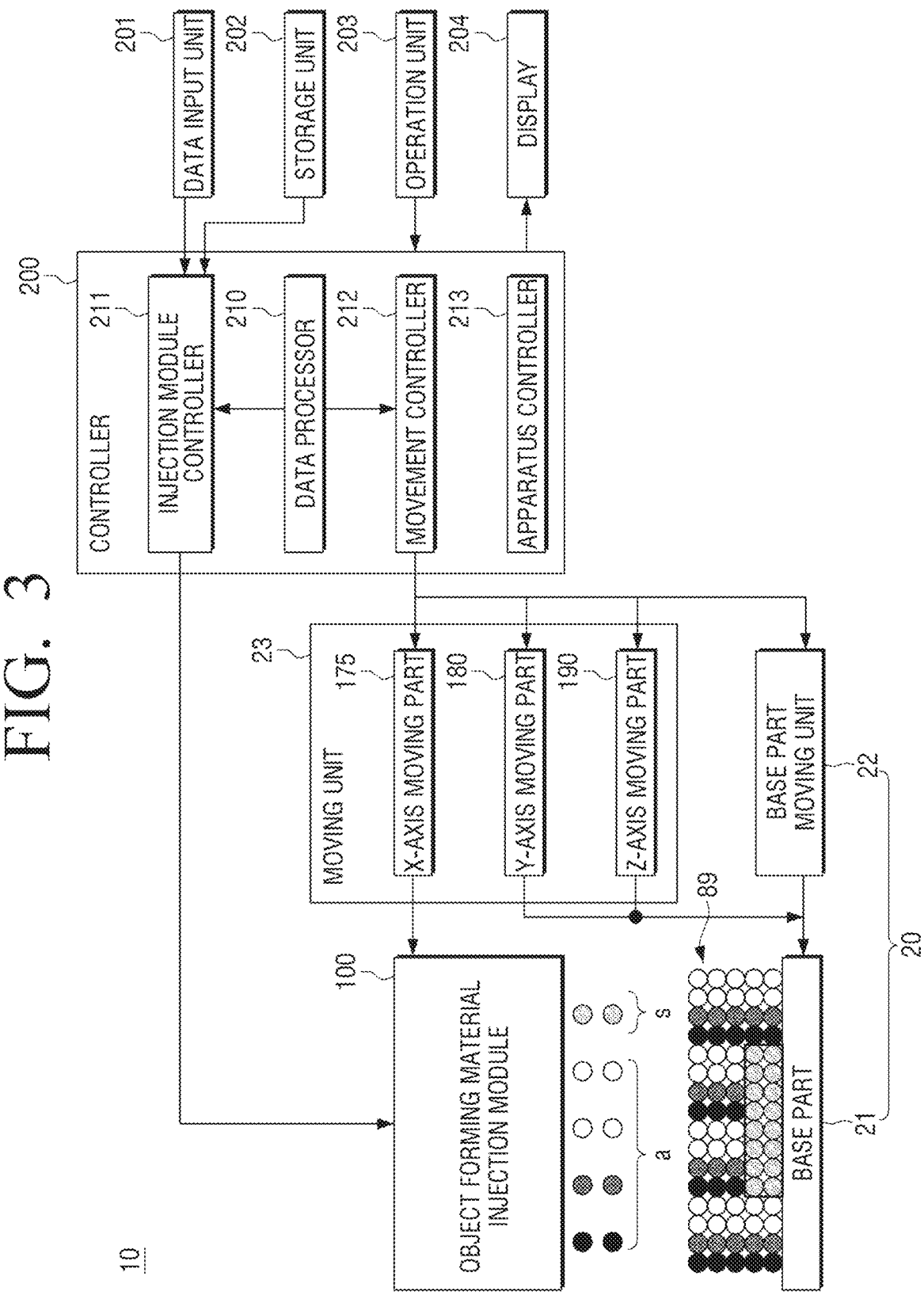
FIG. 3 is a diagram illustrating a configuration of an object forming apparatus according to an embodiment of the present disclosure.
Figure 4:
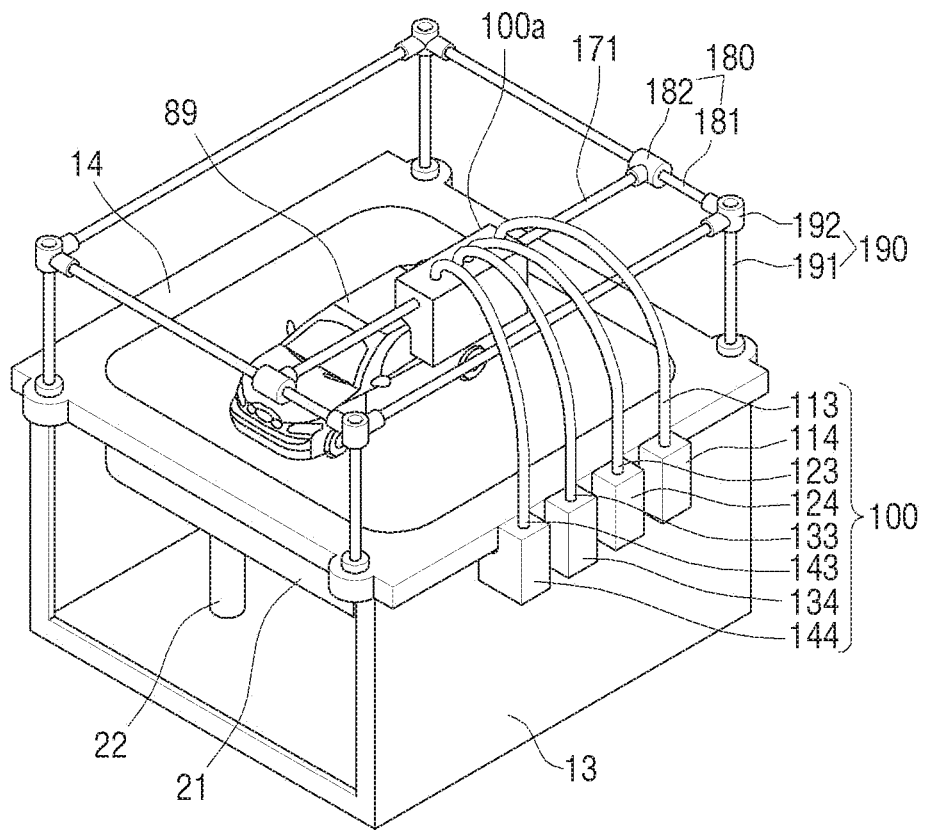
FIG. 4 is a diagram illustrating an internal structure of an object forming apparatus according to an embodiment of the present disclosure.

FIG. 2 is a perspective view illustrating an outer appearance of an object forming apparatus according to an embodiment of the present disclosure, FIG. 3 is a diagram illustrating a configuration of an object forming apparatus according to an embodiment of the present disclosure, and FIG. 4 is a perspective view illustrating an internal structure of an object forming apparatus according to an embodiment of the present disclosure.

Referring to FIGS. 2, 3, and 4, an object forming apparatus 10 may include an outer housing 11, an inner housing 13 installed in an inside of the outer housing 11, and an object forming material injection module 100 provided in an upper end of the inner housing 13. The object forming apparatus 10 may include a base part 21 in which the object 89 is formed, various moving parts 22, 175, 180, and 190, a controller 200, a data input unit 201, a storage unit 202, an operation unit 203, and a display 204. If necessary, a portion of the components in the object forming apparatus 10 may be omitted. The object forming apparatus 10 may further include other components which are not described herein.

As illustrated in FIG. 2, the inner housing 13 and various parts related to the object forming apparatus 10 may be built in the outer housing 11, and the various parts built in the outer housing 11 may be protected by the outer housing 11. The outer housing 11 may provide a function to block an object forming space from the outside so that the object forming apparatus 10 may stably form the object 89 without interference of the outside. An opening may be provided in at least one surface of the outer housing 11, and the user may acquire the completed object 89 through the opening. If necessary, a closable/openable door may be provided in the opening. If necessary, at least one among the data input unit 201 configured to receive data, the operation unit configured to receive a command from the user through the user's operation, and the display 204 configured to display a variety of information to the user may be provided in the outer housing 11.

Various parts related to the control of the object forming apparatus 10 may be built in the inner housing 13. For example, a semiconductor chip configured to perform a function of the controller 200, a board on which the semiconductor chip are mounted, and the like, may be installed in the inside of the inner housing 13. At least one among the data input unit 201 configured to receive the data, the operation unit configured to receive the command from the user through the user's operation, and the display 204 configured to display the variety of information to the user may be provided in the inner housing 13.

The base part 21 may be provided in the inner housing 13. The base part 21 may have a flat plate-like shape in which the object is formed. A top surface of the base part 21 may be exposed in a top surface 14 of the inner housing 13, and an object forming material a and a support material s injected from the object forming material injection module 100 may be stacked on the top surface of the base part 21. The base part 21 may move to a Z-axis direction or rotate based on the Z-axis through the base part moving unit 22. The movement of the base part 21 may be controlled according to a shape of the object 89 to be formed, and the like. In an embodiment of the present disclosure, the base part 21 may move to an injection direction of the object forming material a or a direction opposite to the injection direction of the object forming material a. For example, the base part 21 may move to a direction opposite to the direction in which the object forming material injection module 100 is located in such a manner that the object 89 formed of the object forming material a stacked through the stacking of the object forming material a is not in contact with the object forming material injection module 100. In another example, the base part 21 may move toward the object forming material injection module 100 so that the stacked object forming material a may be planarized through a leveling roller 101. In an embodiment of the present disclosure, the base part 21 may move to a direction perpendicular to the injection direction of the object forming material a. In this embodiment of the present disclosure, the base part 21 may move to at least one of an X-axis direction and a Y-axis direction so that the object forming material a injected according to the object to be formed may reach an appropriate position of the top surface of the base part 21 and then stacked. For example, the base part 21 may move to the injection direction of the object forming material a or a direction opposite to the injection direction of the object forming material a while moving to a direction perpendicular to the injection direction of the object formation material. The base part moving unit 22 may be provided in an inner side of the inner housing 13, and the base part moving unit 22 may move or rotate the base part 21 to a certain direction through driving of a motor or an actuator.

The object forming material injection module 100 may allow the object 89 to be formed by injecting the object forming materials a having different colors toward the base part 21. If necessary, the object forming material injection module 100 may allow the objects having various shapes to be formed by further injecting a support materials. The object forming material injection module 100 may include a main body 100a configured to inject the object forming materials a having the different colors, a plurality of object forming material cartridges 114, 124, 134, and 144 configured to supply the object forming materials a having the different colors, and a plurality of tubes 113, 123, 133, and 143 configured to couple the main body 100a and the cartridges 114, 124, 134, and 144. The main body 100a may inject the object forming materials a having the different colors provided from the cartridges 114, 124, 134, and 144. The object forming materials a may include a photo curing ink cured according to received light. Nozzles (see 112, 122, 132, 142, and 152 of FIG. 5) and a board configured to control the object forming material injection module 100 may be provided in the main body 100a. The object forming materials a having the different colors may be stored in the cartridges 114, 124, 134, and 144. The cartridges 114, 124, 134, and 144 may be replaceably installed in the object forming material injection module 100. The cartridges 114, 124, 134, and 144 may store the object forming materials a having the different colors. For example, the first cartridge 114 may store a C object forming material, the second cartridge 124 may store an M object forming material, the third cartridge 134 may store a Y object forming material, and the fourth cartridge 144 may store a W object forming material. The object forming materials stored in the cartridges 114, 124, 134, and 144 may be supplied to the main body 100a through the connection tubes 113, 123, 133, and 143 coupled to the cartridges 114, 123, 134, and 144. The connection tubes 113, 123, 133, and 143 may be formed of a rubber material, and the like. Paths which the object forming materials a pass through may be provided in the inside of the connection tubes 113, 123, 133, and 143. In response to the cartridges 114, 124, 134, and 144 being directly attachable and couplable to the main body 100a, the plurality of cartridges 114, 124, 134, and 144 may be omitted.

The object forming apparatus 10 may include a moving unit 23 configured to move the object forming material injection module 100. The object forming material injection module 100 may move to at least one of the X-axis direction, the Y-axis direction, and the Z-axis direction through the moving unit 23. The object forming material injection module 100 may move and simultaneously inject the object forming materials a having the different colors or the support material s. For example, the moving unit 23 may include an X-axis moving unit 175, a Y-axis moving unit 180, and a Z-axis moving unit 190. In another example, the moving unit 23 may include only the X-axis moving unit 175.

The X-axis moving unit 175 and the Y-axis moving unit 180 may move the object forming material injection module 100 to a horizontal direction. In an embodiment of the present disclosure, the X-axis moving unit 175 may include an X-axis bar 171 moving along the object forming material injection module 100. The X-axis bar 171 may include a rail. The object forming material injection module 100 may move along the X-axis bar 171 by rotation of a built-in rotary wheel or toothed wheel or by a belt. Accordingly, the object forming material injection module 100 may move to a positive (+) X-axis direction or a negative (−) X-axis direction along the X-axis. For the rotation of the built-in rotary wheel or toothed wheel, at least one or more motor or actuator may be built in the object forming material injection module 100. The motor may be an AC motor or a blushless DC (BLDC) motor. In an embodiment of the present disclosure, the Y-axis moving unit 180 may include a Y-axis bar 181 and a moving body 182 moving along the Y-axis bar 181. The Y-axis bar 181 may include a rail. The moving body 182 may move along the Y-axis bar 181 by rotation of a built-in rotary wheel or toothed wheel, and thus the object forming material injection module 100 may move along the Y-axis. A motor or an actuator may be built in the moving body 182. In various embodiments of the present disclosure, the movement to the Y-axis direction may be performed by the base part 21.

The Z-axis moving unit 190 may move the object forming material injection module 100 to a vertical direction. In an embodiment of the present disclosure, the Z-axis moving unit 190 may include a Z-axis bar 191 and a moving body 192 moving along the Z-axis bar 191. The moving body 192 may move along the Y-axis bar 191 including a rail by rotation of a built-in rotary wheel or toothed wheel, and thus the object forming material injection module 100 may move along the Z-axis. For the rotation of the rotary wheel, a motor may be built in the moving body 192. In an embodiment of the present disclosure, an actuator may be built in the moving body 192. In various embodiments of the present disclosure, the movement to the Z-axis direction may be performed by the base part 21.

The embodiment of the present disclosure has described that the X-axis moving unit 175, the Y-axis moving unit 180, and the Z-axis moving unit 190 may move the object forming material injection module 100 using the bars 171, 181, and 191, but the operation of the X-axis moving unit 175, the Y-axis moving unit 180, and the Z-axis moving unit 190 are not limited thereto. For example, the X-axis moving unit 175, the Y-axis moving unit 180, and the Z-axis moving unit 190 may move the object forming material injection module 100 using fluid pressure. The skilled in the art may employ the various object moving methods to the X-axis moving unit 175, the Y-axis moving unit 180, and the Z-axis moving unit 190. In an embodiment of the present disclosure, the object forming apparatus 10 may include all the X-axis moving unit 175, the Y-axis moving unit 180, and the Z-axis moving unit 190 or a portion of the X-axis moving unit 175, the Y-axis moving unit 180, and the Z-axis moving unit 190. For example, the object forming apparatus 10 may include only the X-axis moving unit 175 and the Y-axis moving unit 180. In this example, in response to at least one of the X-axis moving unit 175, the Y-axis moving unit 180, and the Z-axis moving unit 190 being not presented, the base part 21 may move to a direction in which the at least one moving unit is not presented. For example, in response to the Z-axis moving unit 190 being not presented, the base part 21 may move to the Z-axis direction.

The object forming apparatus 10 may further include the controller 200 configured to control an overall operation of the object forming apparatus 10. The controller 200 may be implemented with one or more semiconductor chips operated by a certain program, a printed circuit board in which the semiconductor chips are installable, and the like. The controller 200 may include a central processing unit (CPU), a micro controller unit (MCU), and the like.

As illustrated in FIG. 3, the controller 200 may include a data processor 210, an injection module controller 211, a movement controller 212, and an apparatus controller 213.

The data processor 210 may analyze object data for the object 89 stored in the data input unit 201 or the storage unit 202, and transfer the analysis result to the injection module controller 211 or the movement controller 212. For example, the data processor 210 may extract coordinates for various points of the object 89, such as an outer surface or feature points of the object 89 based on the object data, and determine injection positions or injection amounts of the object forming materials a according to the extracted coordinates. The data processor 210 may determine injection patterns of the object forming materials a through the injectors (see 110 to 150 of FIG. 5).

The injection module controller 211 may generate a control signal for controlling the object forming material injection module 100 according to the determination result of the data processor 210. The injection module controller 211 may generate control signals for the injectors 110 to 150 according to the injection patterns determined in the data processor 210, and transmit the generated control signals to the object forming material injection module 100. In an embodiment of the present disclosure, the injection module controller 211 may determine the injection patterns of the injectors 110 to 150. The injection module controller 211 may generate a control signal for controlling the leveling roller 101 or an exposure unit (see 160 of FIG. 5) provided in the object forming material injection module 100. The injection module controller 211 may generate the control signal for controlling the leveling roller 101 or the exposure unit 160 according to the injection of the object forming materials a. The injection module controller 211 configured to the control the object forming material injection module 100 as described above may include an injection controller (see 214 of FIG. 5), a roller controller (see 215 of FIG. 5), and an exposure controller (see 216 of FIG. 5).

The movement controller 212 may determine a moving position of the object forming material injection module 100 according to the processing result of the data processor 210, generate a control signal for at least one of the X-axis moving unit 175, the Y-axis moving unit 180, and the Z-axis moving unit 190 of the moving unit 23, and transmit the generated control signal to the at least one of the X-axis moving unit 175, the Y-axis moving unit 180, and the Z-axis moving unit 190 of the moving unit 23. The X-axis moving unit 175, the Y-axis moving unit 180, and the Z-axis moving unit 190 of the moving unit 23 may move the object forming material injection module 100 according to the transmitted control signal. For example, the X-axis moving unit 175 of the moving unit 23 may move the object forming material injection module 100 to the X-axis direction according to the transmitted control signal. The Y-axis moving unit 180 and the Z-axis moving unit 190 of the moving unit 23 may move the base part 21 to the Y-axis direction and the Z-axis direction according to the transmitted control signal.

The movement controller 212 may move or rotate the base part 21 by generating a control signal for the base part moving unit 22 according to the processing result of the data processor 210.

The apparatus controller 213 may control the object forming apparatus 10 by generating control signals for other parts other than the object forming material injection module 100 and the moving unit 23. For example, the apparatus controller 213 may generate a control signal for the display 204 and transmit the generated control signal to the display 204.

FIG. 3 has illustrated that the data processor 210, the injection module controller 211, the movement controller 212, and the apparatus controller 213 are separately provided, but it may not mean that the data processor 210, the injection module controller 211, the movement controller 212, and the apparatus controller 213 are physically necessarily separated. The data processor 210, the injection module controller 211, the movement controller 212, and the apparatus controller 213 may logically be separated. In an embodiment of the present disclosure, different semiconductor chips may perform operations of the data processor 210, the injection module controller 211, the movement controller 212, and the apparatus controller 213, and thus the data processor 210, the injection module controller 211, the movement controller 212, and the apparatus controller 213 may be physically separated.

The data input unit 201 may receive the object data for the object 89 to be formed by the object forming apparatus 10. The object data may be 2D or 3D drawing represented in a digital form. The object data may include information, such as coordinates of an outer surface, boundaries, or feature points of the object 89.

In an embodiment of the present disclosure, the data input unit 201 may include a wired communication module or a wireless communication module which receives data from a remote place. The wired communication module may include a network interface controller (NIC) configured to control communication, a communication cable terminal, a communication cable, and the like. The wireless communication module may include a communication chip which performs wireless communication according to a certain wireless communication method, an antenna, and the like. The wireless communication method may include a Wi-Fi method or a Bluetooth method.

In an embodiment of the present disclosure, the data input unit 201 may include at least one among a serial port, a parallel port, a small computer system interface (SCSI) port, a Deutsche industrie Normen (DIN) terminal, an android debug bridge (ADB) terminal, a personal system/2 (PS/2) terminal, a universal serial bus (USB) terminal, and an institute of electrical and electronics engineers 1394 (IEEE1394) terminal. The data for the object 89 input to the data input unit 201 may be temporarily or non-temporarily stored in the storage unit 202 and then transmitted to the controller 200. The data for the object 89 input to the data input unit 201 may be directly transmitted to the controller 200.

The storage unit 202 may store data, such as the 2D or 3D drawing for the object 89 to be formed. The storage unit 202 may store a variety of information required for control of the object forming apparatus 10. The data stored in the storage unit 202 may be changed or updated by control of the controller 200 or a data input through the data input unit 201. The storage unit 202 may temporarily or non-temporarily store the variety of information. The storage unit 202 may be implemented with various types of semiconductor storage devices or various types of magnetic disc storage device. All various devices capable of being used to store data may be an example of the storage unit 202. The storage unit 202 may be implemented with one storage device or a plurality of storage devices. The storage unit 202 may be implemented with a single type of storage devices. The storage unit 202 may be implemented with different types of storage devices.

The operation unit 203 may receive various commands or a variety of information from the user. The user may input data for the object 89 to be formed by operating the operation unit 203 other than the data input unit 201. The operation unit 203 may be implemented with at least one among a keyboard, a keypad, a knob, a trackball, a joystick, a touch pad, and a touch screen. In response to the operation unit 203 being operated by the user, the operation unit 203 may output an operation signal corresponding to the user operation, and transmit the operation signal to the controller 200.

The display 204 may display a variety of information related to the object forming apparatus 10 and the object 89 to be formed. For example, the display 204 may display the input 3-D drawing or display a controlling method of the object forming apparatus 10 or a message for various errors generated in the operation of the object forming apparatus 10. The display 204 may display a variety of information to the user through a graphic user interface (GUI). The GUI may have various designs according to arbitrary selection of the designer. The display 204 may display various still images or moving images for convenience and aesthetic sense of the user. The display 204 may be operated according to a control signal of the controller 200.

The display 204 may employ at least one among a plasma display panel (PDP), a liquid crystal display (LCD) panel, an organic light emitting diode (OLED) panel, a light emitting diode (LED) panel, and a touch panel. Various devices capable of displaying text or images to the user may be employed as the display 204.

Hereinafter, the object forming material injection module 100 will be described below.

Figure 5:
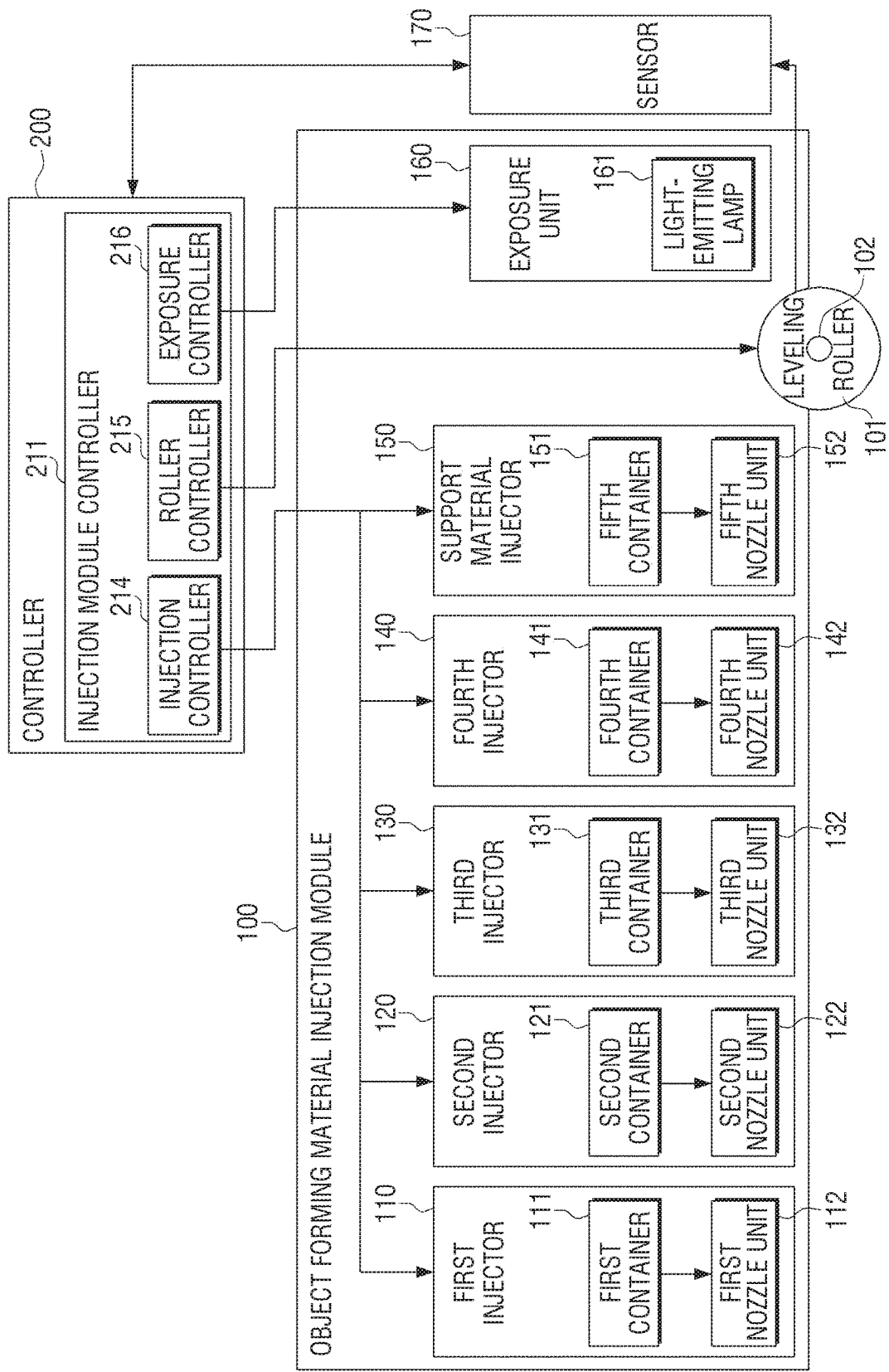
FIG. 5 is a diagram illustrating a configuration of an object forming material injection module according to an embodiment of the present disclosure.
Figure 6A:
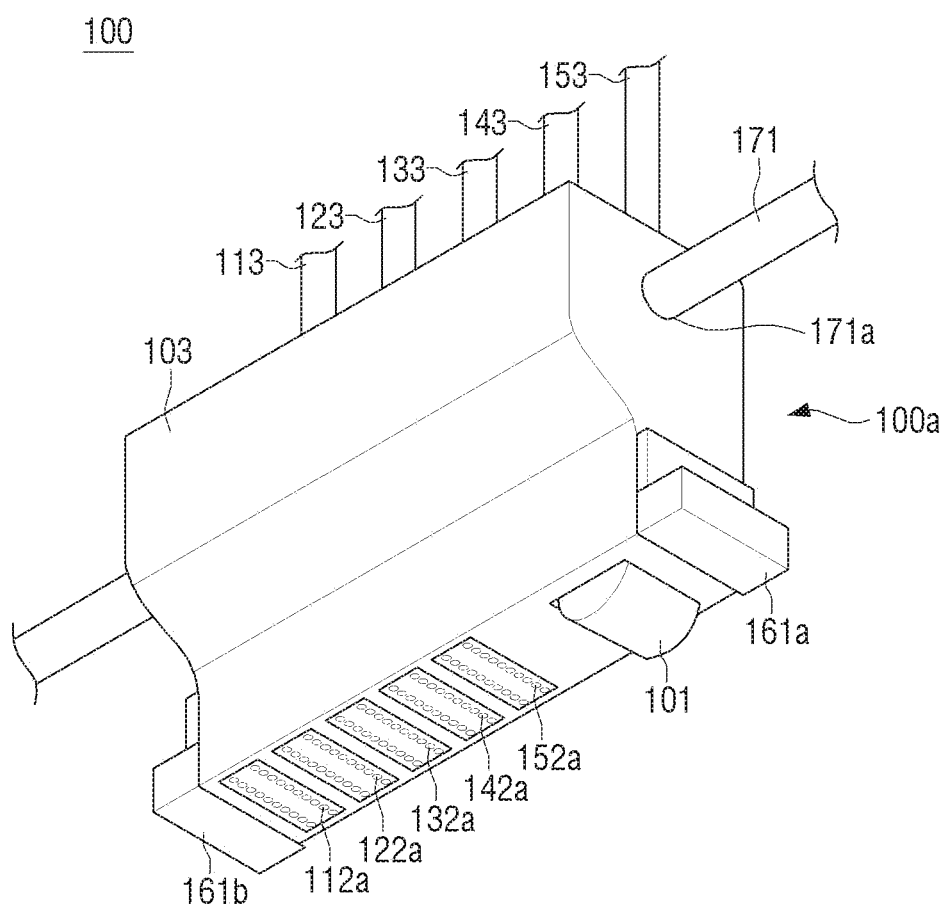
FIG. 6A is a diagram illustrating an object forming material injection module according to an embodiment of the present disclosure.
Figure 6B:
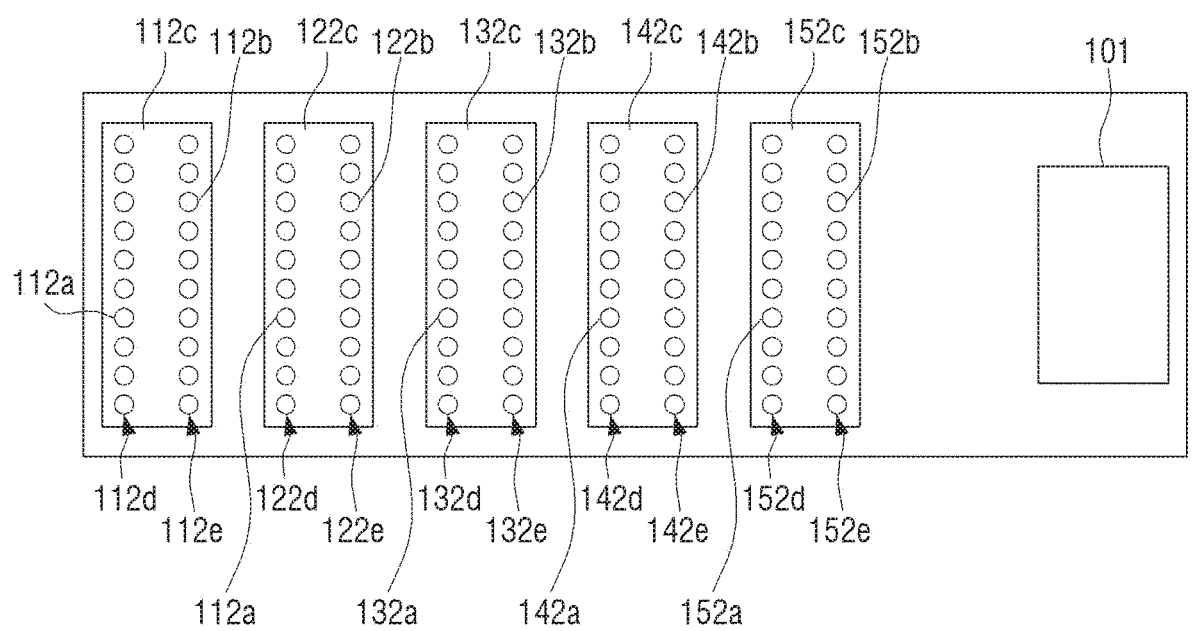
FIG. 6B is a diagram illustrating a bottom of an object forming material injection module according to an embodiment of the present disclosure.

FIG. 5 is a diagram illustrating a configuration of an object forming material injection module according to an embodiment of the present disclosure. FIG. 6A is a diagram illustrating an object forming material injection module according to an embodiment of the present disclosure, and FIG. 6B is a diagram illustrating a bottom of an object forming material injection module according to an embodiment of the present disclosure.

Referring to FIGS. 5, 6A, and 5B, the object forming material injection module 100 may include the plurality of injectors 110 to 150 provided in the inside or outside of the main body 100a, the leveling roller 101, and the exposure unit 160. In various embodiments of the present disclosure, the object forming material injection module 100 may include a sensor 170.

The injectors 110 to 150 may include containers 111, 121, 131, 141, and 151 configured to store object forming materials to be injected and the nozzle units 112, 122, 132, 142, and 153 configured to inject the object forming materials.

The containers 111, 121, 131, 141, and 151 may store the object forming materials corresponding to the injectors 110 to 150. The object forming materials may be stored in the first to fourth containers 111, 121, 131, and 141. For example, in response to a C object forming material being injected in the first injector 110, the first container 111 may store the C object forming material. The fifth container 151 of the support material injector 150 may store a support material. The first to fifth containers 111 to 151 may be provided in the object forming material injection module 100. The first to fifth containers 111 to 151 may be provided in the separated cartridges 114, 124, 134, 144, and 154 as illustrated in FIGS. 2 and 4. In embodiment of the present disclosure, portions of the containers may be provided in the object forming material injection module 100 and the remaining portions of the containers may be provided in the separated cartridges.

As illustrated in FIGS. 6A and 6B, the nozzle units 112 to 152 may include nozzles 112a, 122a, 132a, 142a, and 152a exposed from a housing bottom of the main body 100a to the outside. In an embodiment of the present disclosure, each of the nozzle units 112 to 152 may include only one nozzle 112a, 122a, 132a, 142a, and 152a or include two or more nozzles 112a and 112b, 122a and 122b, 132a and 132b, 142a and 142b, and 152a and 152b. The one or more nozzles 112a and 112b, 122a and 122b, 132a and 132b, 142a and 142b, and 152a and 152b may be provided so that one or more nozzle forming units 112c, 122c, 132c, 142c, and 152c are provided in the bottom of the main body 100a to be directed toward the base part 21. The one or more nozzles 112a and 112b, 122a and 122b, 132a and 132b, 142a and 142b, and 152a and 152b may be formed in the nozzle forming units 112c, 122c, 132c, 142c, and 152c to be arranged in columns 112d, 122d, 132d, 142d, and 152d. The one or more nozzles 112a and 112b, 122a and 122b, 132a and 132b, 142a and 142b, and 152a and 152b may be arranged in two or more columns 112d and 112e, 122d and 122e, 132d and 132e, 142d and 142e, and 152d and 152e. The one or more nozzles 112a and 112b, 122a and 122b, 132a and 132b, 142a and 142b, and 152a and 152b may be arranged in the bottom of the main body 100a in various shapes considerable by the skilled in the art.

In an embodiment of the present disclosure, the one or more nozzles 112a and 112b, 122a and 122b, 132a and 132b, 142a and 142b, and 152a and 152b may have various shapes. For example, the one or more nozzles 112a and 112b, 122a and 122b, 132a and 132b, 142a and 142b, and 152a and 152b may have a shape protruding from the nozzle forming units 112c, 122c, 132c, 142c, and 152c to the outside. In another example, the one or more nozzles 112a and 112b, 122a and 122b, 132a and 132b, 142a and 142b, and 152a and 152b may have a shape of a discharge port provided in a plane.

The nozzles 112a and 112b, 122a and 122b, 132a and 132b, 142a and 142b, and 152a and 152b may discharge object forming materials corresponding thereto so that the object forming materials may be injected toward the base part 21.

Hereinafter, the nozzle units 112 to 152 according to an embodiment of the present disclosure will be described.

Figure 7:
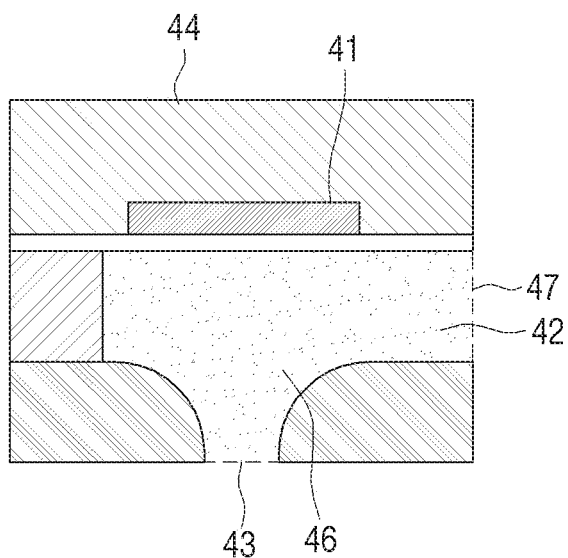
FIG. 7 is a cross-sectional diagram of a nozzle unit according to an embodiment of the present disclosure.

FIG. 7 is a cross-sectional diagram of a nozzle unit according to an embodiment of the present disclosure.

Referring to FIG. 7, a nozzle unit 40 may include a heater 41, a chamber 42, a discharge port 43, a supporter 44, and a supply port 47. The heater 41 may be heated by supply of an external power to generate heat. Various types of materials for generating the heat according to the power supply, for example, a metal may be employed for the heater 41. The chamber 42 may store an object forming material 46 to be discharged toward the discharge port 43. The chamber 42 may be temporarily heated according to the heating of the heater 41, and a bubble (see 45 of FIG. 8) may be generated in the inside of the chamber 42 according to the heating of the chamber 42. The object forming material 46 may include a photo curing ink. The discharge unit 43 may discharge the object forming material 46 in the inside of the chamber 42 to the outside according to the generation of the bubble 45. For example, the supporter 44 may supply the power to the heater 41, and may cool the heater 41. A board for power supply, and the like, may be installed in the supporter 44. The supply port 47 may supply the object forming material 46 to the inside of the chamber 42.

Figure 8:
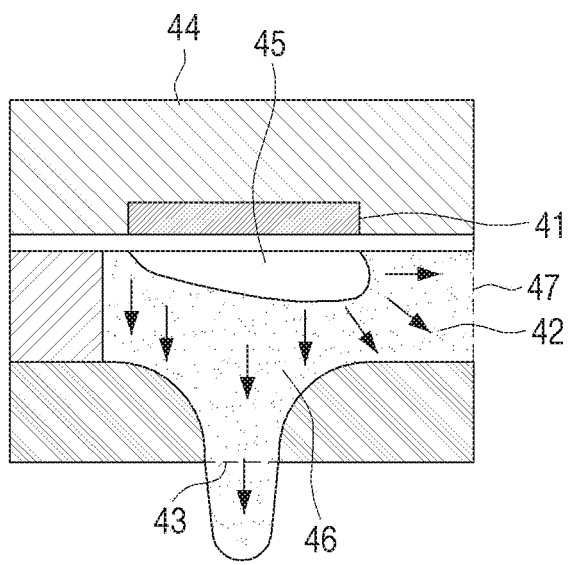
FIGS. 8, 9, and 10 are diagrams illustrating a principle of injecting an object forming material through a nozzle unit according to an embodiment of the present disclosure.
Figure 9:
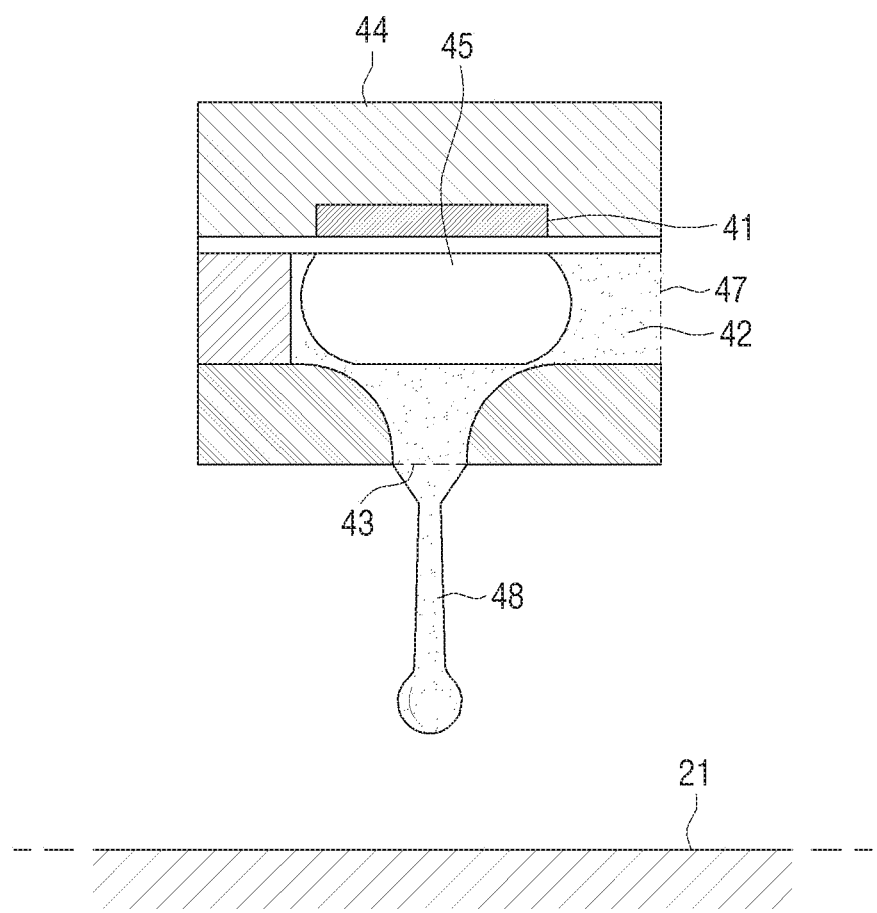
Figure 10:
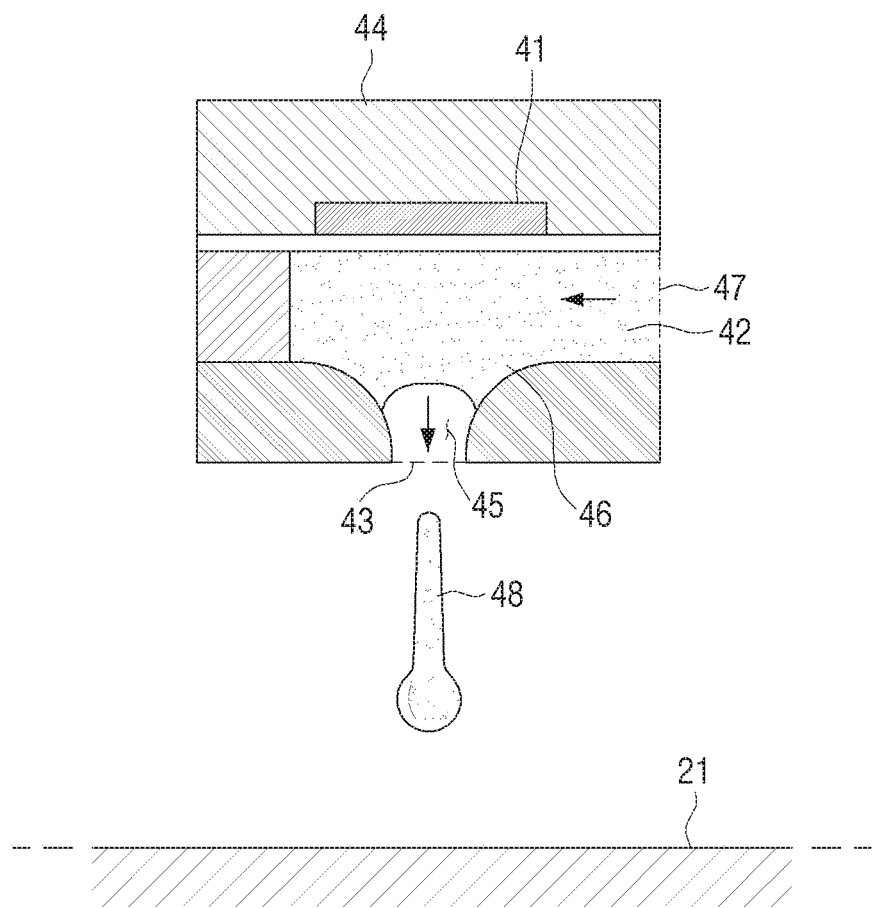

FIGS. 8, 9, and 10 are diagrams illustrating a principle of injecting an object forming material through a nozzle unit according to an embodiment of the present disclosure.

Referring to FIGS. 8 and 9, the heater 41 of the nozzle unit 40 may spontaneously generate the heat according to the power application, and the bubble 45 may be generated in the inside of the chamber 42. In response to the object forming material 46 being a photo curing ink, the bubble 45 may be generated in the inside of the chamber 42 by a co-solvent of the photo curing ink. The generated bubble 45 may expand to apply the force to the object forming material 45, and thus the object forming material 45 may be discharged to the outside through the discharge port 43. A discharged object forming material 48 may move toward the base part 21. As illustrated in FIG. 10, in response to heating of the heater 41 being terminated and cooled, the generated bubble 45 may be discharged to the outside through the discharge port 43 or may be dissipated in the inside of the chamber 42. An empty space may be formed in the inside of the chamber 42 according to the discharge or dissipation of the bubble 45, and the object forming material 46 may be supplied to the formed empty space through the supply port 47 again.

As illustrated in FIG. 5, the injectors 110 to 150 may be designed to inject the different object forming materials a or substances. For example, the first to fourth injectors 110 to 140 may be designed to inject the object forming materials, as such a photo curing ink, and the support material injector 150 may be designed to inject the support material s such as paraffin or glycerin. In this example, the first injector 110 may be designed to inject a C object forming material, the second injector 120 may be designed to inject an M object forming material, the third injector 130 may be designed to inject a Y object forming material, and the fourth injector 140 may be designed to inject a W or K object forming material.

The injectors 110 to 150 may be controlled by the injection controller 214 of the controller 200. The injection controller 214 may determine an injection time, an injection amount, and the like, according to the data analysis result of the data processor 210, and control the injectors 110 to 150 according to the determined injection time or injection amount.

The leveling roller 101 may rotate based on a shaft 102. As illustrated in FIGS. 6A and 6B, the leveling roller 101 may be exposed on the bottom of the main body 100a and perform a function to planarize the stacked object forming materials a. The leveling roller 101 may rotate by acquiring driving force through a roller provided in the inside of a housing of the main body 100a. The leveling roller 101 may rotate to an arbitrary direction. The rotation direction of the leveling roller 101 may be determined according to the moving direction of the object forming material injection module 100. In an embodiment of the present disclosure, unlike the leveling roller 101 illustrated in FIGS. 5 and 6A, the leveling roller 101 may not be provided in the object forming material injection module 100. In this example, the leveling roller 101 may be provided as a separate module in the object forming apparatus 10 and may be installed in the top surface 14 of the inner housing 13.

The leveling roller 101 may be mounted on a top surface of the base part 21 of on the previously fixed object forming material and may planarize one surface of the object forming material, for example, a top surface of the object forming material by pressing the stacked object forming material. Accordingly, the object forming material to be subsequently may be injected and fixed onto an appropriate position of the fixed object forming material.

The leveling roller 101 may be controlled by the roller controller 215 of the controller 200. The roller controller 215 may determine a rotation direction and rotation speed of the leveling roller 101 according to the injections of the injectors 110 to 150, and control the leveling roller 101 by generating a control signal corresponding to the determined rotation direction and rotation speed and transmitting the control signal to a motor coupled to the leveling roller 101.

The sensor 170 may be coupled to the leveling roller 101. For example, a contact sensor may be coupled to the leveling roller 101 and may detect pressure applied to the contact sensor by an object which is being formed. The contact sensor physically coupled to the leveling roller 101 may detect the pressure applied to the contact sensor by the object and transmit the detected pressure to the controller 200, and the controller 200 may calculate a height of the object based on a signal output from the contact sensor.

For example, the controller 200 may calculate the height of the object by setting a reference value through measuring of the pressure applied to the roller through the contact sensor at a point of time when the object starts to be formed, and by measuring the pressure applied to the roller according to the subsequent stacking of the object forming material. The controller 200 may determine the injection time, the injection amount, and the like, of the object forming material by controlling the injectors 110 to 150 through the injection controller 214 according to the height of the object.

The exposure unit 160 may allow the stacked object forming material a or the support material s to be cured by irradiating a light having a certain wavelength, for example, a UV ray, to the stacked object forming material a or support material s. The exposure unit 160 may include a light-emitting lamp 161 configured to irradiate light. As illustrated in FIG. 6A, one object forming material injection module 100 may include a plurality of light-emitting lamps 161a and 161b. The plurality of light-emitting lamps 161a and 161b may be provided in the bottom of the main body 100a. For example, the plurality of light-emitting lamps 161a and 161b may be installed in a side surface of the bottom of the main body 100a in which the nozzles 112a and 112b, 122a and 122b, 132a and 132b, 142a and 142b, and 152a and 152b. In response to the plurality of light-emitting lamps 161a and 161b being provided, the object forming material a or the support material s may be cured by irradiating light to the object forming material a or the support material s is stacked just after the object forming material a or the support material s regardless of the moving direction of the main body 100a of the object forming material injection module 100. Two light-emitting lamps 161a and 161b are provided in FIG. 6A, but the number of light-emitting lamps is not limited thereto, and three or more light-emitting lamps may be provided in the main body 100a. In an embodiment of the present disclosure, unlike the exposure unit 160 illustrated in FIGS. 5 and 6A, the exposure unit 160 may not be provided in the object forming material injection module 100. In this example, the exposure unit 160 may be provided as a separate module in a specific position in the object forming apparatus 10, and may irradiate the light to the stacked object forming material a or support material s.

The sensor 170 may detect the height of the object 89 stacked in the base part 21. The sensor 170 may be disposed in the inside or the outside of the object forming material injection module 100. The sensor 170 may detect the height of the object and transmit the detected value to the controller 200. The controller 200 may determine the injection time or the injection amount of the injected object forming material based on the value output from the sensor. For example, the controller 200 may measure a current height of the object 89 by receiving the detected value from the sensor 170, compare the current height of the object with the reference height (that is, the actual height of the object acquired from the object data), and control the injectors 110 to 140 according to the comparison result.

In this example, in response to the current height of the object being larger than the reference height, the controller 200 may control an object forming material to be subsequently injected in a smaller amount than a reference amount. In response to the current height of the object being smaller than the reference height, the controller 200 may control the object forming material to be subsequently injected in a larger amount than the reference amount.

The reference height may be determined by calculating the number of layers stacked from the point of time when the object starts to be formed. For example, in response to a height of the one layer being 10 µm and a 50-th layer being currently printed, the reference height may be 0.5 cm. In response to the height of the object measured through the sensor 170 being 0.51 cm, the controller 200 may control the object forming material to be subsequently injected in a smaller amount than the reference amount.

The sensor 170 may be implemented with at least one of a contact sensor, a photo sensor, an ultrasonic sensor, and a proximity sensor. For example, the sensor 170 may be the contact sensor, the contact sensor may be mounted on the inside of the object forming material injection module 100 and may measure the height of the object 89 through the physical contact with the leveling roller 101. The contact sensor may be in physical contact with the leveling roller 101. In response to the sensor 170 being the photo sensor, the photo sensor may be mounted on the outside of the object forming material injection module 100 and may measure the height of the object being formed in the base part 21. The light irradiated from the photo sensor may be reflected from a surface of the object and return to the photo sensor, and the controller 200 may measure the height of the object based on the signal output from the photo sensor.

As illustrated in FIG. 6A, the plurality of connection tubes 113, 123, 133, 143, and 153 configured to receive the object forming materials a or the support material s from the cartridges 114, 124, 134, and 144 outside the main body 100a may be coupled to the main body 100a of the object forming material injection module 100. The object forming material injection module 100 may further include a fastening part 171a configured to couple the moving unit 23, such as the X-axis bar 171 and the main body 100a. The fastening part 171a may couple the main body 100a and the moving unit 23 so that the main body 100a may move by the moving unit 23. The fastening part 171a may be a through hole which the X-axis bar 171 is passed through as shown in FIG. 6A. The fastening part 171a may include various fasteners configured to couple the main body 100a and the X-axis bar 171.

Figure 11A:
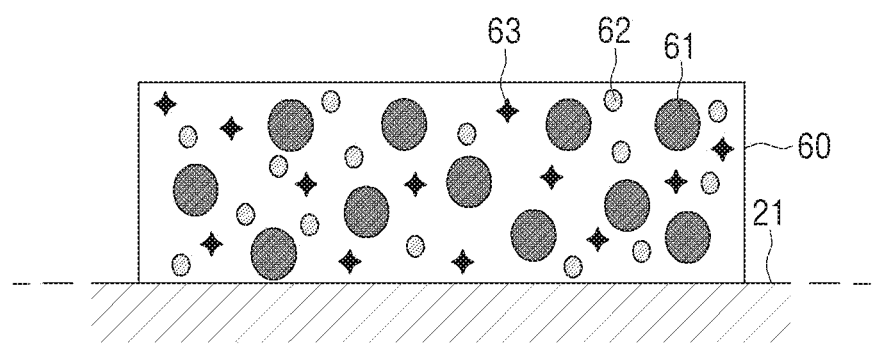
FIGS. 11A, 11B, and 11C are diagrams illustrating a process of fixing an object according to UV irradiation according to an embodiment of the present disclosure.
Figure 11B:
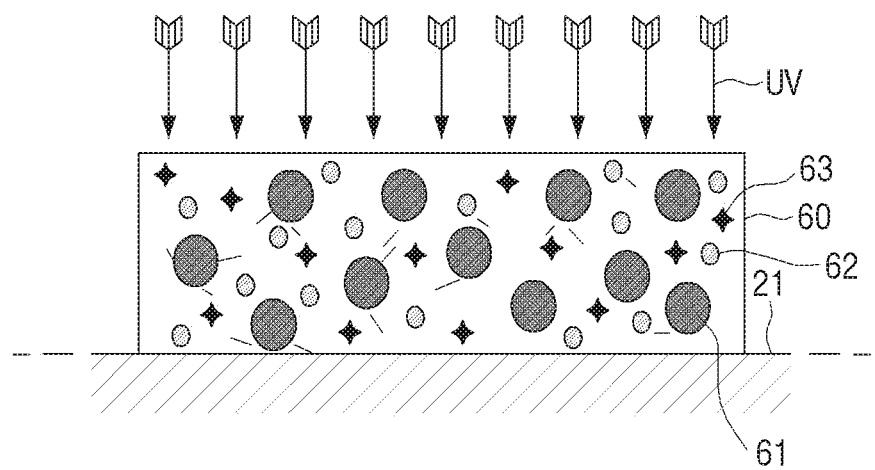
Figure 11C:
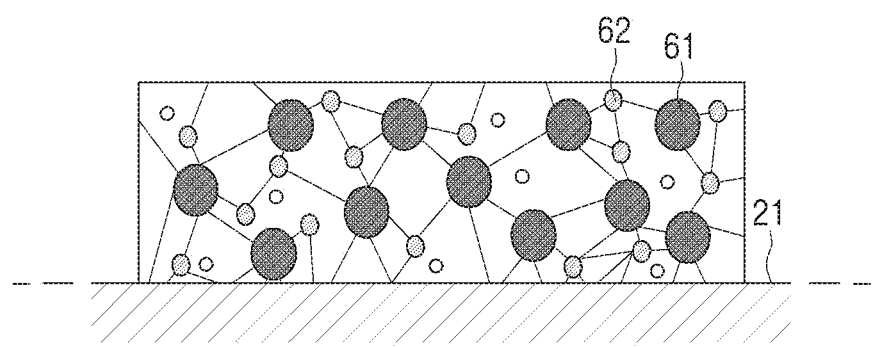

FIGS. 11A, 11B, and 11C are diagrams illustrating a process of fixing an object according to UV irradiation according to an embodiment of the present disclosure.

Referring to FIGS. 11A, 11B, and 11C, they illustrate a process of curing the object forming material a in response to the object forming material a being a photo curing ink and the exposure unit 160 being a UV lamp configured to irradiate a UV ray. As illustrated in FIG. 11A, a photo curing ink 60 injected to and stacked on the base part 21 before curing may include an oligomer 61, a monomer 62, and a photo polymerization initiator 63. As illustrated in FIG. 11B, in response to the UV ray being irradiated to the photo curing ink 60 from the outside, the photo polymerization initiator 63 in the photo curing ink 60 may be decomposed to a free radical, and thus the polymerization reaction between the oligomer 61 and the monomer 62 may be induced. In response to the oligomer 61 and the monomer 62 being combined through the polymerization reaction, the photo curing ink 60 may be cured and thus the object 89 may be finally formed as illustrated in FIG. 11C. Accordingly, the object 89 may be formed using the stacked object forming material a.

Figure 12:
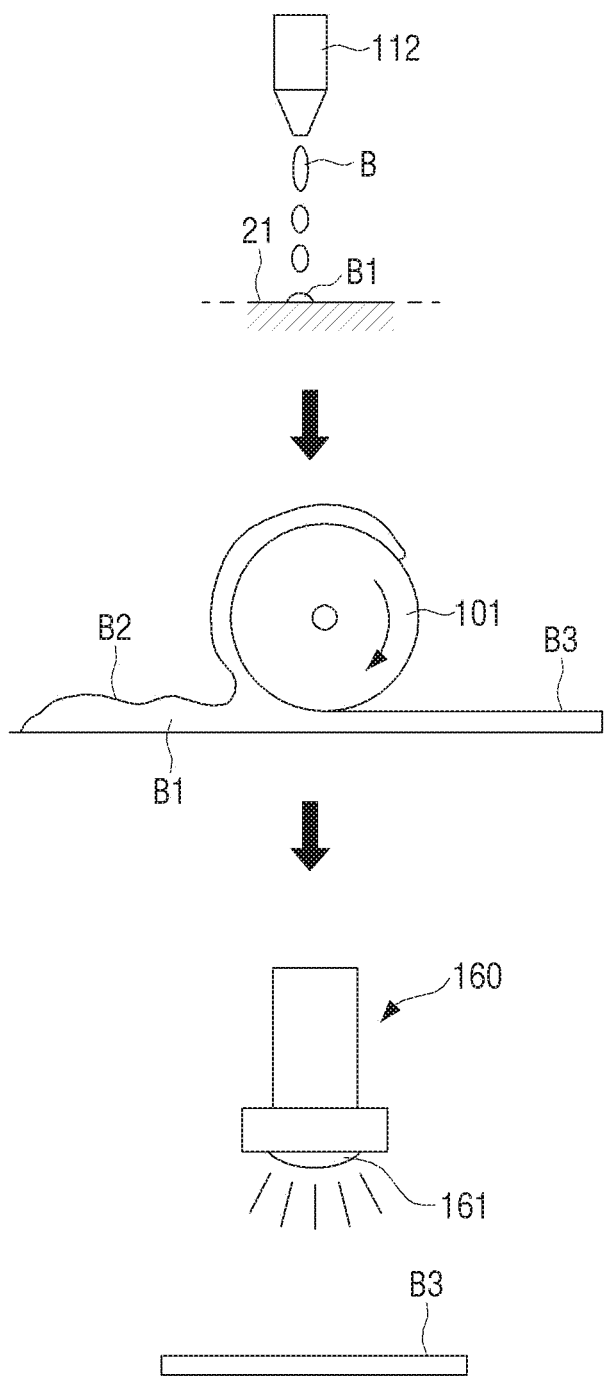
FIG. 12 is a diagram illustrating an object forming process of an object forming apparatus according to an embodiment of the present disclosure.

FIG. 12 is a diagram illustrating an object forming process of an object forming apparatus according to an embodiment of the present disclosure.

Referring to FIG. 12, an object forming material B, such as a photo curing ink may be injected from a nozzle of the object forming apparatus 10, for example, the first nozzle 112, and the injected object forming material B may be accumulated to form a stacked object forming material B 1. In response to the object forming material B1 being stacked on the base part 21, the leveling roller 101 may rotate and simultaneously planarize an uneven portion B2 of the stacked object forming material B 1. A planarized object forming material B3 may be irradiated by certain light, for example, a UV ray from the light-emitting lamp 161 of the exposure unit 160, and cured as described above, and therefore, the object 89 may be formed.

Figure 13:
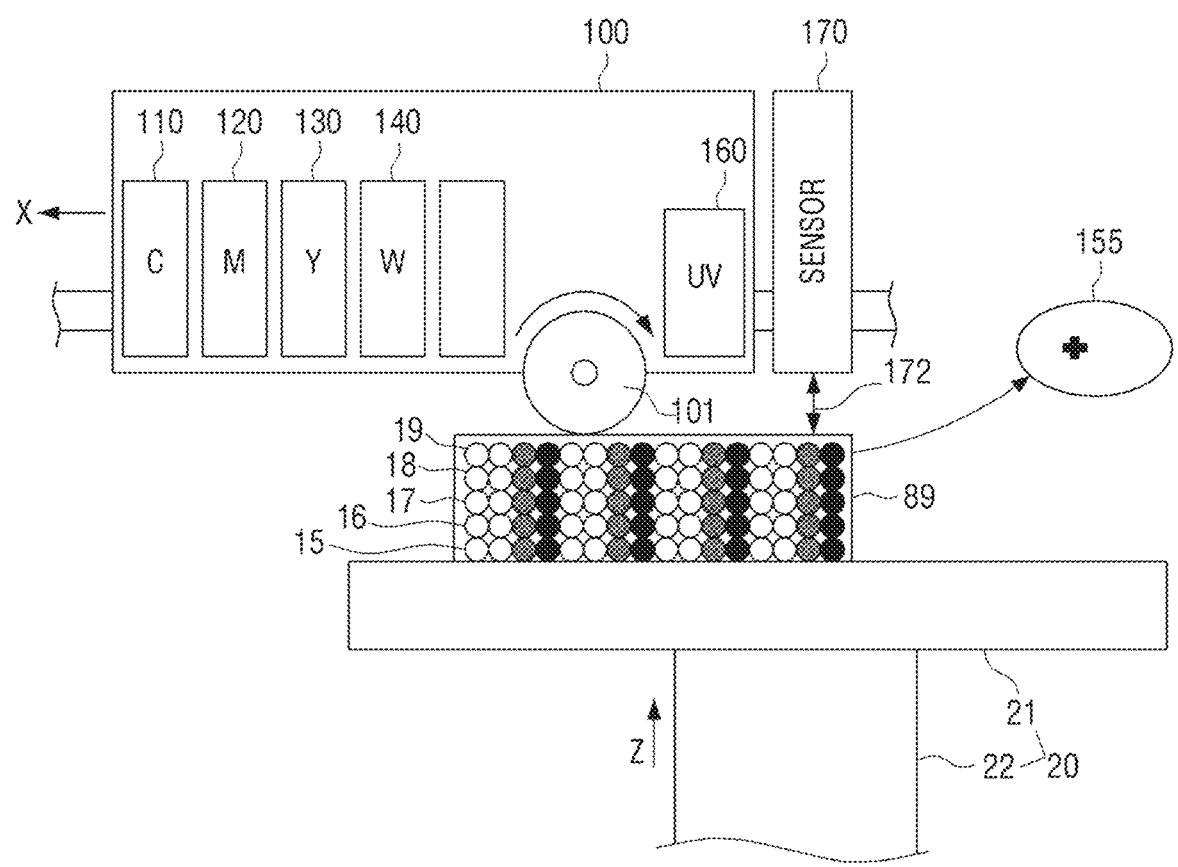
FIG. 13 is a diagram illustrating a method of measuring a height of an object using an photo sensor according to an embodiment of the present disclosure.

FIG. 13 is a diagram illustrating a method of measuring a height of an object using a photo sensor according to an embodiment of the present disclosure.

Referring to FIG. 13, the object forming apparatus 10 may include the object forming material injection module 100 and an object forming unit 20. The object forming material injection module 100 may include the first injector 110 configured to inject a C object forming material a1, the second injector 120 configured to inject an M object forming material a2, the third injector 130 configured to inject a Y object forming material a3, and the fourth injector 140 configured to inject a W object forming material a4, a leveling roller 101 configured to planarize the injected and stacked C, M, Y, and W object forming materials, an exposure unit 160 configured to irradiate a UV ray to the stacked and planarized C, M, Y, and W object forming materials, and the sensor 170. The sensor 170 may be disposed outside of the object forming material injection module 100.

The object forming unit 20 may include the base part 21 and the base part moving unit 22. The base part moving unit 22 may move the base part 21 to the Z-axis direction according to the stacking of the object forming materials a1 to a4.

The first to fourth injectors 110 to 140 of the object forming material injection module 100 may equally inject the object forming materials a1 to a4. For example, the first to fourth injectors 110 to 140 may inject the equal amount of object forming materials a1 to a4. The term "equal amount" may refer to "completely equal injection amount" or "slightly different injection amount". Since the object forming materials a1 to a4 are equally injected from the injectors 110 to 140, the object 89 may be formed of the equal amount of object forming materials a1 to a4. The injectors 110 to 140 may inject the object forming materials a1 to a4 to the base part 21 according to certain patterns. The first to fourth injectors may inject the object forming materials a1 to a4 in a plurality of circulations. For example, the first to fourth injectors 110 to 140 may inject all the object forming materials a1 to a4 in the same pattern every circulation P1 to P4. In another example, the first to fourth injectors 110 to 140 may inject all the object forming materials a1 to a4 in the different patterns every circulation P1 to P4. In another example, the first to fourth injectors 110 to 140 may inject the object forming materials a1 to a4 in the different patterns only in at least one of the circulations P1 to P4. The object forming material injection module 100 may continuously move while the first to fourth injectors 110 to 140 inject the object forming materials a1 to a4. The object forming material injection module 100 may reciprocally move along the X-axis or the Y-axis.

As illustrated in FIG. 13, the object 89 may include a plurality of layers 15 to 19, and the layers 15 to 19 may be formed of different object forming materials. For example, the different object materials in the layers 15 to 19 may be formed in the certain pattern. The object forming materials in the layers 15 to 19 may be formed in the same pattern. In this example, the same object forming material 81 as an object forming material 82 may be stacked directly on any one object forming material 82.

In response to the sensor 170 being a photo sensor, the photo sensor may be disposed in the inside or the outside of the object forming material injection module 100. The photo sensor may output an electrical signal corresponding to a distance 172 to the object 89 by irradiating light, and the controller 200 may measure the height of the object 89 by receiving the electrical signal. A pattern 155 having at least one of a specific color and a specific shape may be inserted in the inside of the object 89 to easily measure the height of the object 89. The controller 200 may measure the height of the object 89 using an output value of the photo sensor reflected from the pattern 155. The controller 200 may adjust the injection amount and the injection time of the object forming material injected from the object forming material injection module 100 according to the height of the object. For example, the controller 200 may determine the injection amount and the injection time of the object forming material injected from the object forming material injection module 100 by adjusting a temperature of the heater included in the object forming material injection module 100.

Figure 14:
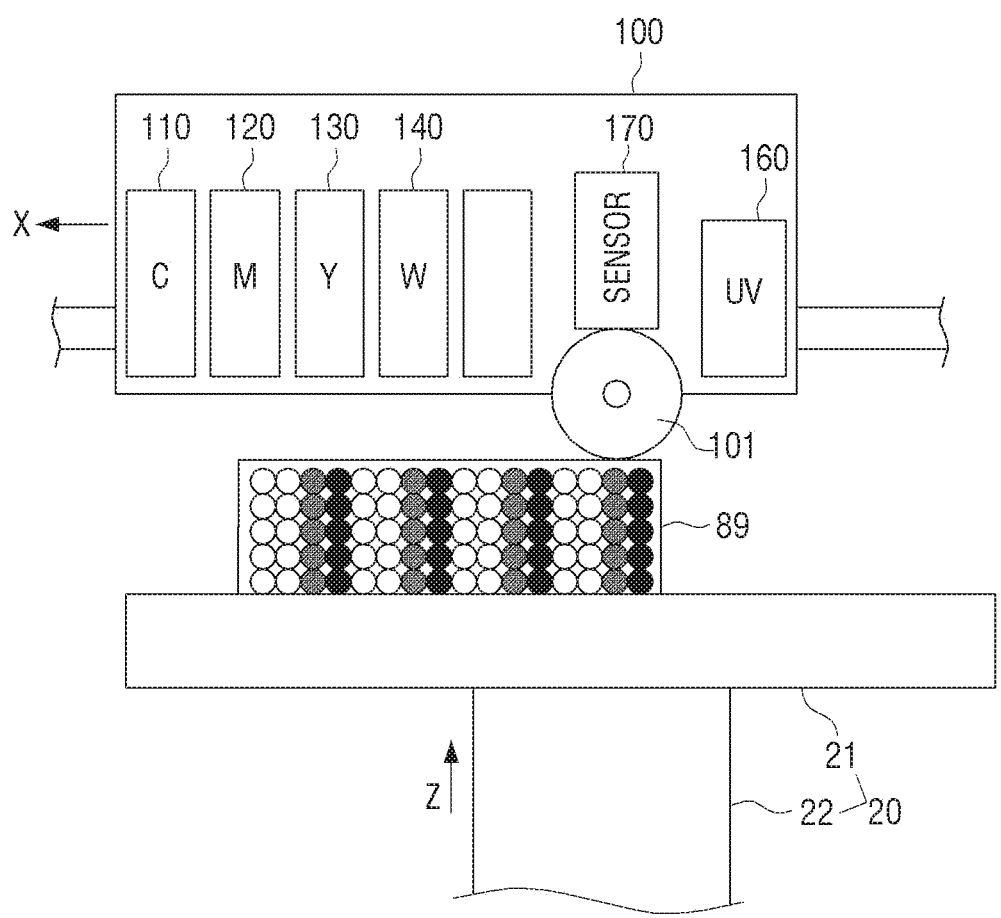
FIG. 14 is a diagram illustrating a method of measuring a height of an object using a contact sensor according to an embodiment of the present disclosure.

FIG. 14 is a diagram illustrating a method of measuring a height of an object using a contact sensor according to an embodiment of the present disclosure.

Referring to FIG. 14, the object forming apparatus 10 may include the object forming material injection module 100 and the object forming unit 20. The object forming material injection module 100 may include the first injector 110 configured to inject the C object forming material a1, the second injector 120 configured to inject the M object forming material a2, the third injector 130 configured to inject the Y object forming material a3, and the fourth injector 140 configured to inject the W object forming material a4, a leveling roller 101 configured to planarize the injected and stacked C, M, Y, and W object forming materials, an exposure unit 160 configured to irradiate the UV ray to the stacked and planarized C, M, Y, and W object forming materials, and the sensor 170.

The sensor 170 may be physically coupled to the leveling roller 101. For example, the sensor 170 may be a contact sensor. The contact sensor may be physically coupled to the leveling roller 101 and output a sensor value according to the height of the object 89 through the leveling roller 101. The controller 200 may measure the height of the object 89 based on an output value of the sensor 170. The controller 200 may adjust the injection amount and the injection time of the object forming material injected from the object forming material injection module 100 according to the height of the object 89. For example, the controller 200 may determine the injection amount and the injection time of the object forming material injected from the object forming material injection module 100 by adjusting a temperature of the heater included in the object forming material injection module 100.

Figure 15:
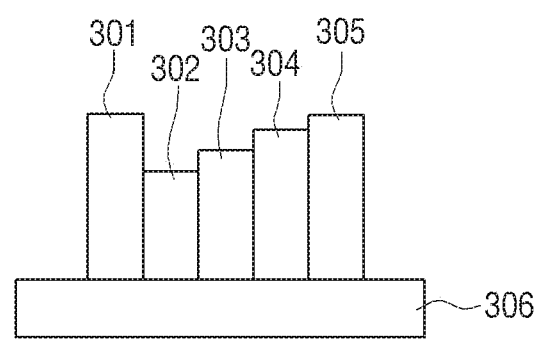
FIG. 15 is a diagram illustrating a method of correcting a height deviation of an object for color according to an embodiment of the present disclosure.

FIG. 15 is a diagram illustrating a method of correcting a height deviation for colors of an object according to an embodiment of the present disclosure.

Referring to FIG. 15, cross-sections of a support material 301, a C object forming material 302, an M object forming material 303, a Y object forming material 304, and a support material 305 formed on a base part 306 are illustrated. The object forming material injection module 100 may inject object forming materials by heating the object forming materials through a micro heater, and thus injection amounts of the object forming materials may be changed according to temperatures and components of the object forming materials. In response to the single color object forming materials being accumulated to a height direction, height differences between the object forming materials for colors may be caused. In response to the injection amounts of the support material and the object forming material being different from each other, a height difference between the accumulated support material and the accumulated object forming material may be caused. The controller 200 may determine height differences between the object forming materials for colors through the sensor 170, and may vary the injection amounts of the object forming materials for colors by controlling the temperature of the heater. For example, the controller 200 may control the temperature of the heater in the object forming material injection module 100 in order of the C object forming material>the M object forming material>the Y object forming material>the support material, and thus the injection amounts of the object forming materials may be adjusted.

Figure 16A:
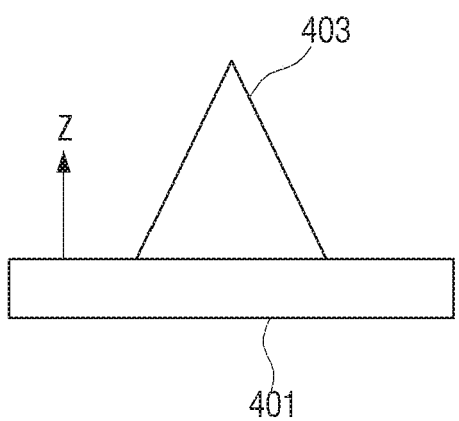
FIGS. 16A and 16B are diagrams illustrating methods of correcting a deviation according to a shape according to an embodiment of the present disclosure.
Figure 16B:
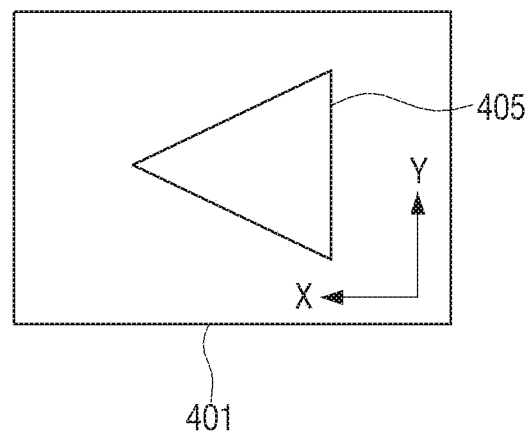

FIGS. 16A and 16B are diagrams illustrating a method of correcting a deviation according to a shape according to an embodiment of the present disclosure.

Referring to FIG. 16A, a base part 401 and an object 403 may be illustrated. The object 403 may have a conic shape of which a cross-section area is reduced toward the Z-axis direction. In response to the shape area being changed, the number of nozzles simultaneously operated to form an object may be changed, and thus the temperature of the object forming material injection module may be changed. The injection amount may be changed due to the change in the temperature of the object forming material injection module. Accordingly, to prevent the change in the injection amount due to the temperature change, the controller 200 may increase the temperature of the object forming material injection module 100 as the object forming material injection module 100 processes toward the Z-axis direction in response to the cross-sectional area being reduced toward the Z-axis direction.

Referring to FIG. 16B, a base part 401 and an object 405 may be illustrated according to an embodiment of the present disclosure. The object 405 may have a shape of which a cross-section area is reduced toward the X-axis direction. In response to the cross-section area being changed toward the X-axis direction, the controller 200 may correct the deviation by gradually reducing the temperature of the object forming material injection module 100 as the object forming material injection module 100 processes toward the X-axis direction.

Figure 17:
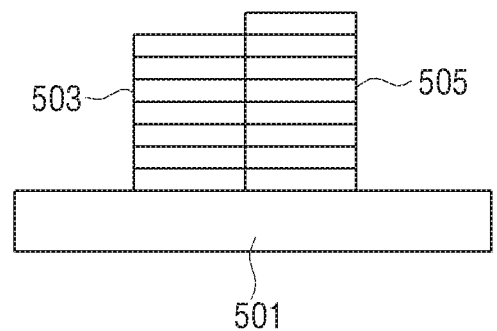
FIG. 17 is a diagram illustrating a method of correcting a deviation due to stacking of single color object forming materials according to an embodiment of the present disclosure.

FIG. 17 is a diagram illustrating a method of correcting a deviation due to stacking of single color object forming materials according to an embodiment of the present disclosure.

Referring to FIG. 17, a base part 501, a C object 503, and a Y object 505 may be illustrated. The object 503 may be formed by stacking a single color object forming material (for example, a C object forming material) to a height direction, and the object 505 may be formed by stacking a single color object forming material (for example, a Y object forming material) to the height direction. In response to the single color object forming materials being stacked to the height direction, the injection amounts of the object forming materials may be different according to the colors. Accordingly, an error may be accumulated and a height difference between the objects 503 and 505 having different colors. The controller 200 may measure the heights of the object 503 and 505 having the different colors based on signals output from the sensor 170, and correct an error according to the heights for colors. For example, in response to a layer thickness of the C object 503 being 8 μm, a layer thickness of the Y object 505 being 9 μm, and the number of layers in the objects 503 and 505 being 8, the height difference between the objects 503 and 505 may be 8 μm. The controller 200 may measure the height difference between the C object 503 and the Y object 505 through the sensor 170, and adjust the height difference by further injecting the C object forming material by the injection amount corresponding to one layer.

FIGS. 18A, 18B, 18C, 18D, 18E, and 18F are diagrams illustrating methods of dispersing a defect due to nozzle damage in object formation according to an embodiment of the present disclosure.

In response to the object being formed in a state in which a portion of nozzles in the object forming material injection module 100 is blocked or abnormal injection in the nozzle occurs, the defect may occur in a specific position of the object due to the damaged nozzle. The controller 200 may rotate the base part 21 to a certain angle, for example, ten degrees whenever one layer is formed so as to prevent the defect in the specific position of the object due to the damaged nozzle from being concentrated and to disperse the position in which the defect occurs.

Accordingly, even in response to the defect being generated in a specific nozzle of the object forming material injection module 100, the defect position may be equally dispersed in the object. Since the object may be formed through other nozzles whenever one layer is formed in the specific position of the object, rapid increase the temperature of the specific heater in object forming material injection module 100 may be prevented.

Figure 18A:
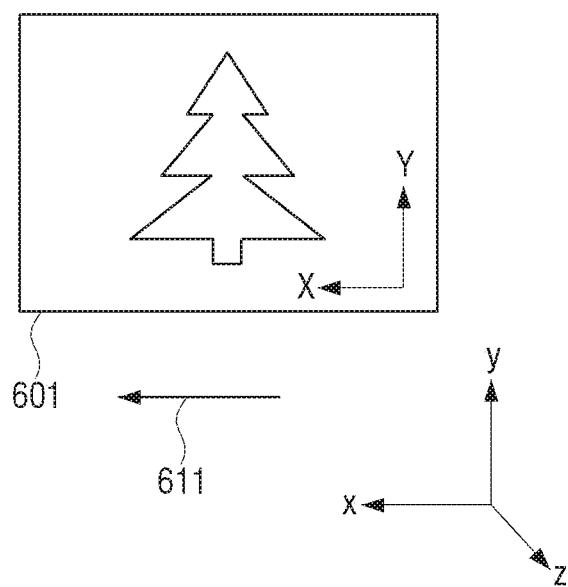
FIGS. 18A, 18B, 18C, 18D, 18E, and 18F are diagrams illustrating methods of dispersing a defect due to nozzle damage in object formation according to an embodiment of the present disclosure.
Figure 18B:
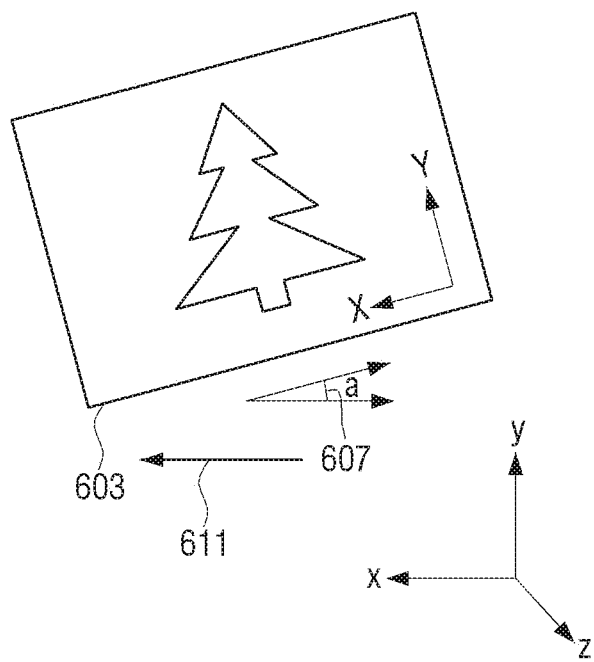
Figure 18C:
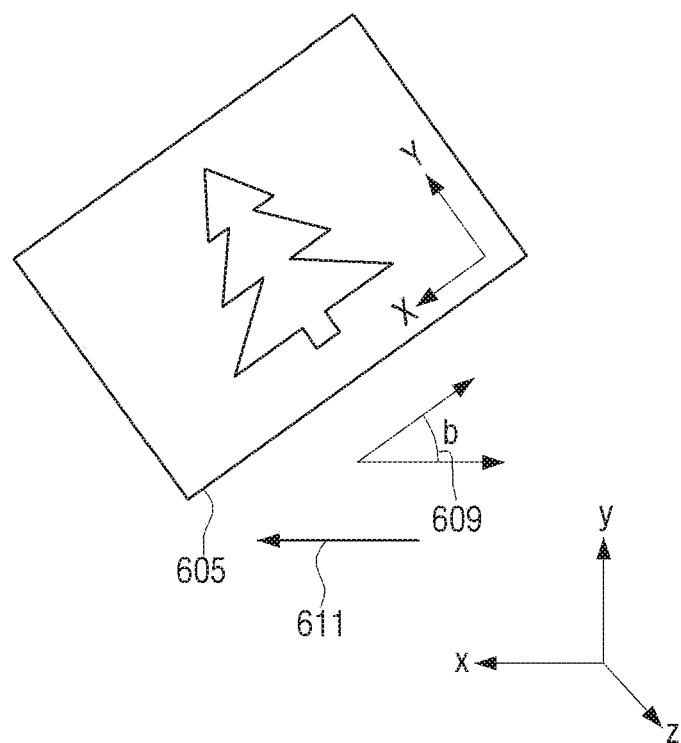
Figure 18D:
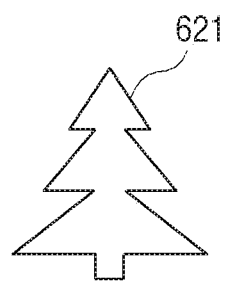

Referring to FIGS. 18A and 18D, an angle between a base part 601 and an injector process direction 611 may be 0 (zero). The controller 200 may form a first layer in a state that the base part 601 is set to 0 (zero) degree with respect to the injection process direction 611. The 3D data output from the storage unit 202 may be output in a shape as illustrated in FIG. 18D. Object data 621 stored in the storage unit 202 may be output in a basic shape.

Figure 18E:

Referring to FIGS. 18B and 18E, an angle between a base part 603 and an injector process direction 611 may be a degrees 607 and 627, for example, 10 degrees. The controller 200 may form a second layer in a state that the base part 603 is rotated by the a degrees 607 and 627 with respect to the injection process direction 611. The 3D data output from the storage unit 202 may be output in a shape as illustrated in FIG. 18E. Object data 623 stored in the storage unit 202 may be output in a rotated state by the a degrees 607 and 627 (for example, 10 degrees) with respect to the basic shape.

Figure 18F:
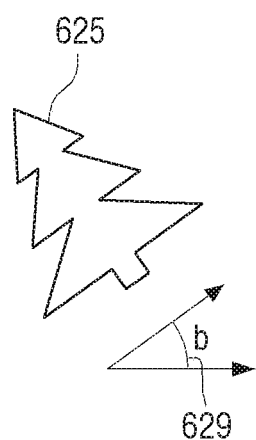

Referring to FIGS. 18C and 18F, an angle between a base part 605 and an injector process direction 611 may be b degrees 609 and 629, for example, 20 degrees. The controller 200 may form a second layer in a state that the base part 605 is rotated by the b degrees 609 and 629 with respect to the injection process direction 611. The 3D data output from the storage unit 202 may be output in a shape as illustrated in FIG. 18F. Object data 625 stored in the storage unit 202 may be output in a rotated state by the b degrees 609 and 629 (for example, 20 degrees) with respect to the basic shape.

The example that the base part is rotated whenever one layer is formed has been described, but this is not limited thereto. The base part may be rotated whenever two or more layers are formed.

Figure 19:
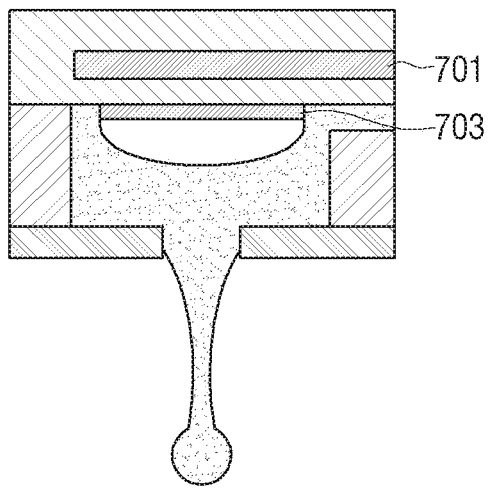
FIG. 19 is an enlarged diagram illustrating a nozzle part according to an embodiment of the present disclosure.

FIG. 19 is an enlarged diagram illustrating a nozzle portion according to an embodiment of the present disclosure.

Referring to FIG. 19, a first heater 701 and a second heater 703 may be illustrated. The first heater 701 may heat the whole injector. The second heater 703 may heat a chamber having a nozzle. The controller 200 may control the first heater 701 to independently control the temperature of the injector.

The controller 200 may generate a second pulse signal for heating the second heater 703 to adjust an amount of an object forming material injected through the nozzle, and control the temperature of the heater 703 by controlling a voltage and a width of the second pulse signal. The controller 200 may control the temperature of the second heater 703 by generating a pre pulse before the second pulse signal is generated.

In response to a liquid droplet being discharged in the injector for a long time, an impurity may be formed on a surface of the second heater, and thus the droplet speed may be reduced or the droplet weight may be changed. To correct variation in the injector for temporal change, the controller 200 may determine the number of droplets accumulated in each injector in actual object formation, and maintain the constant droplet weight by controlling the temperatures of the first and second heaters to be increased according to the time elapse.

Figure 20:
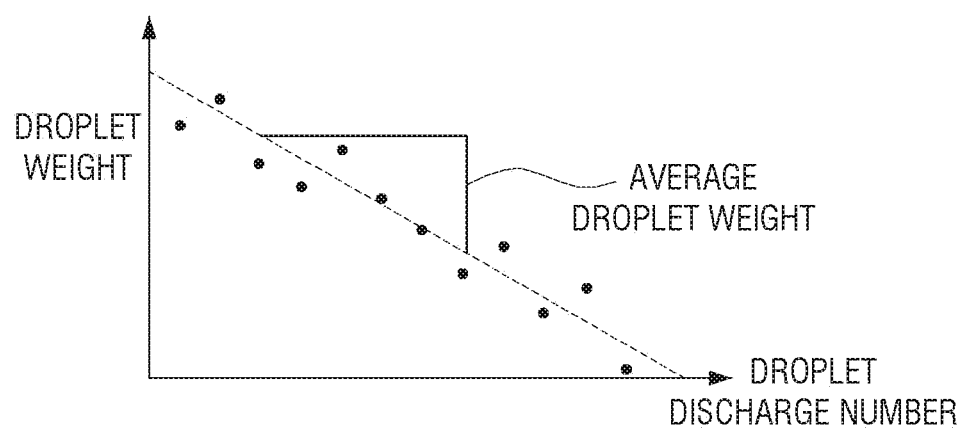
FIG. 20 is a graph indicating change in a weight of a liquid droplet according to a discharge number of liquid droplet according to an embodiment of the present disclosure.

FIG. 20 is a graph indicating a change in a droplet weight according to a droplet discharge number according to an embodiment of the present disclosure.

Referring to FIG. 20, as the droplet discharge number is increased, the weight of the droplet injected from the injector may be reduced. For example, as the usage time of the injector is increased, the droplet weight may be reduced. To address the issues, the object forming apparatus 1 according to an embodiment of the present disclosure may measure the average weight of the droplet, and control the weight of the droplet injected from the injector to be close to the average weight by controlling the temperatures of the first heater 701 and the second heater 703 based on the average droplet weight.

For example, the controller 200 may measure weights of the object forming material for colors and the support material through a scale provided in a maintenance stage. The controller 200 may determine the average weight of the droplet by spitting the droplets of the object forming material and the support material by the fixed number on the scale in a fixed period. The controller 200 may control the temperatures of the first heater 701 and the second heater 703 based on the determined average weight of the droplet. The controller 200 may reduce the temperatures of the first heater 701 and the second heater 703 in response to the weight of the drop injected from the injector being greater than the average weight, and increase the temperatures of the first heater 701 and the third heater 703 in response to the weight of the droplet being lower than the average weight.

FIG. 21 is a flowchart illustrating an object forming process of an object forming apparatus according to an embodiment of the present disclosure.

Referring to FIG. 21, the object forming apparatus 1 may inject an object forming material to the base part based on object data at operation S1001. The object data may be stored in the storage unit 202. The object forming apparatus 1 may control the injector by analyze the object data stored in the storage unit 202, and inject the object forming material to the base part 21.

The object forming apparatus 1 may control the object forming material to be injected in a desired position of the base part by moving the object forming material injection module 100 and the base part 21 based on the object data analysis result, and form an object by stacking the object forming material at operation S1003. For example, the object forming apparatus 1 may determine a position of the object in an X-Y plane by analyzing the object data, and complete one layer of the object by moving the object forming material injection module 100 to the X-axis and the Y-axis. In another example, the object forming apparatus 1 may form the first layer of the object by moving the object forming material injection module 100 to the X-axis and moving the base part to the Y-axis direction. In response to the first layer of one object being formed, the object forming apparatus 1 may form a second layer by moving the base part 21 to the Z-axis direction through the same process.

The object forming apparatus 1 may detect a height of the object formed in the base part 21 by analyzing data output from the sensor at operation S1005. The object forming apparatus 1 may calculate a reference height of the object from the object data, and determine a deviation by comparing the reference height of the object and a height of the object formed in the base part 21, and control an injection amount of the object forming material injected to the base part based on the deviation at operation S1007.

For example, the object forming apparatus 1 may set an initial height by analyzing data output from the sensor 170 at a point of object forming time. As the object forming material is injected and stacked, the height of the object may be changed, and thus the data output from the sensor may be changed. The object forming apparatus 1 may determine the height of the object in real time by comparing the sensor data in the initial height and the sensor data acquired in real time during the object formation. The object forming apparatus 1 may control the injection amount of the object forming material injected to the base part 21 based on the height of the acquired object.

In response to a nozzle being blocked due to a defect in a specific injector, the object forming material may not be normally injected, and thus the object of which a specific portion is damaged may be formed. To address the issues, the object forming apparatus 1 according to an embodiment of the present disclosure may form the object by periodically changing the position of the object formed in the base part 21, and thus disperse the defect.

For example, the object forming apparatus 1 may form the object by rotating the base part 21 based on the Z-axis to a preset angle in a fixed period. In this example, the object forming apparatus 1 may form the first layer of the object in the base part, and then form the second layer by rotating the base part by 10 degrees. The object may be formed by repeatedly performing the above-described processes, and thus the defect caused by the defect nozzle may be equally dispersed to the entire position of the object.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An object forming apparatus comprising:
   an injector configured to inject an object forming material based on object data;
   a base part, wherein an object is formed on the base part by stacking the object forming material;
   a roller configured to planarize a layer;
   a sensor configured to detect a first height of the object while forming the object and detect a position of the roller to detect the first height; and
   at least one processor configured to:
      determine a second height of the object from the object data,
      determine a deviation based on the first height and the second height, and
      based on the deviation, control the object forming material to be subsequently injected in a smaller amount than a reference amount or control the object forming material to be subsequently injected in a larger amount than the reference amount,
   wherein the second height is determined based on a number of layers stacked since the forming of the object began and a height corresponding to the number of layers from the object data.

2. The object forming apparatus of claim 1, wherein the injector comprises:
   a chamber to which the object forming material is supplied;
   a heater configured to generate bubbles in the chamber by applying heat to the object forming material; and
   a nozzle configured to inject the object forming material onto the base part based on a pressure of the chamber,
   wherein the pressure of the chamber changes based on a property of the bubbles.

3. The object forming apparatus of claim 2, wherein the at least one processor is further configured to control the heater to control an amount of the object forming material that is injected onto the base part.

4. The object forming apparatus of claim 3, wherein the at least one processor is further configured to control a temperature of the heater by controlling a voltage and a width of a pulse signal applied to the heater.

5. The object forming apparatus of claim 3, wherein the at least one processor is further configured to control a temperature of the heater by applying a pre-pulse before a pulse signal is applied to the heater.

6. The object forming apparatus of claim 2, wherein the at least one processor is further configured to, when a cross-sectional area of the object is reduced in a direction orthogonal to a surface of the base part, control a temperature of the heater in proportion to the second height.

7. The object forming apparatus of claim 2, wherein, when a cross-sectional area of the object is reduced in a direction parallel to a surface of the base part that is being formed, the at least one processor is further configured to control a temperature of the heater according to the forming of the object in the direction.

8. The object forming apparatus of claim 2, wherein the at least one processor is further configured to control a temperature of the heater according to a total usage time of the injector.

9. The object forming apparatus of claim 2, wherein the heater comprises:
 a first heating element configured to apply heat to the injector; and
 a second heating element configured to apply heat to the chamber.

10. The object forming apparatus of claim 1,
 wherein a plurality of injectors for colors are provided, and
 wherein the at least one processor is further configured to control injection amounts of object forming materials injected from the injectors for colors based on the deviation.

11. The object forming apparatus of claim 10, wherein the at least one processor is further configured to:
 control a temperature of each injector of the plurality of injectors based on a color of object forming material output by each injector of the plurality of injectors.

12. The object forming apparatus of claim 1, wherein the at least one processor is further configured to control the injector to form a pattern detected by the sensor.

13. The object forming apparatus of claim 12, wherein the pattern is formed based on at least one of a certain color and shape.

14. The object forming apparatus of claim 1, further comprising a moving device configured to rotate the base part.

15. The object forming apparatus of claim 14, wherein the at least one processor is further configured to control the moving device to rotate the base part to a preset angle based on a direction orthogonal to a surface of the base part in a fixed period.

16. The object forming apparatus of claim 15, wherein the at least one processor is further configured to control the base part by rotating the base part to the preset angle in the fixed period.

17. The object forming apparatus of claim 1, wherein the at least one processor is further configured to:
 control an amount of the object forming material injected from the injector based on an average weight of a liquid droplet injected from the injector.

18. The object forming apparatus of claim 1, wherein the at least one processor is further configured to:
 determine a profile of the object from the object data,
 while the injector is moving in a horizontal direction, control the amount of the object forming material injected from the injector based on the profile.

19. The object forming apparatus of claim 1,
 wherein the deviation is determined after a layer is formed, and
 wherein, after the layer is cured, the object forming material to be subsequently injected based on the deviation.

* * * * *